(12) United States Patent
Kopf

(10) Patent No.: US 12,293,367 B2
(45) Date of Patent: *May 6, 2025

(54) SYSTEMS AND METHODS FOR FACILITATING BIOMETRIC TOKENLESS AUTHENTICATION FOR SERVICES

(71) Applicant: Kenneth A. Kopf, Greensboro, NC (US)

(72) Inventor: Kenneth A. Kopf, Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/504,516

(22) Filed: Nov. 8, 2023

(65) Prior Publication Data

US 2024/0152921 A1    May 9, 2024

Related U.S. Application Data

(63) Continuation of application No. 17/306,765, filed on May 3, 2021, now Pat. No. 11,847,651, which is a
(Continued)

(51) Int. Cl.
*G06Q 20/40* (2012.01)
*G06F 16/22* (2019.01)
(Continued)

(52) U.S. Cl.
CPC ... *G06Q 20/40145* (2013.01); *G06F 16/2255* (2019.01); *G06F 21/32* (2013.01);
(Continued)

(58) Field of Classification Search
CPC ......... G06Q 20/40145; G06Q 20/3827; G06Q 40/02; G06Q 20/4016; G06Q 2220/00;
(Continued)

(56) References Cited

U.S. PATENT DOCUMENTS 5,613,012 A    3/1997    Hoffman et al.
5,615,277 A    3/1997    Hoffman
(Continued)

FOREIGN PATENT DOCUMENTS

WO    2001093167 A1    12/2001
WO    WO-0193167 A1 *    12/2001    ............. G06F 21/32

OTHER PUBLICATIONS

Draft Standard for Biometric Open Protocol—2017 (Year: 2017).
(Continued)

*Primary Examiner* — Nizar N Sivji
(74) *Attorney, Agent, or Firm* — Morgan, Lewis & Bockius LLP

(57) ABSTRACT

Systems and methods for tokenless authorization are provided. Obtaining an electronic representation of an initial biometric sampling of a registrant. Applying the initial electronic representation to a template data construct producing a unique digital identifier (UDI). Obtaining account information constructs corresponding to an account by the registrant with a third party. Generating a unique secure identification number (SIN) using the UDI and the account information constructs. Storing a unique link from the UDI to the account information constructs. Receiving a request for service and an electronic representation of a second biometric sampling. Forming the UDI by applying the second electronic representation to the template data construct. Verifying the UDI corresponds to the stored UDI to reconstruct the unique SIN from the UDI and using this unique SIN to retrieve the account information constructs using the indexed data structure. Transmitting the request and the unique SIN to the third party.

23 Claims, 10 Drawing Sheets

Related U.S. Application Data continuation-in-part of application No. 15/987,832, filed on May 23, 2018, now abandoned.

(60) Provisional application No. 62/510,007, filed on May 23, 2017.

(51) Int. Cl.

| | | |
|---|---|---|
| *G06F 21/32* | (2013.01) | |
| *G06Q 10/02* | (2012.01) | |
| *G06Q 20/38* | (2012.01) | |
| *G06Q 40/02* | (2023.01) | |
| *G06V 40/12* | (2022.01) | |
| *H04L 9/32* | (2006.01) | |

(52) U.S. Cl.
CPC ......... *G06Q 10/02* (2013.01); *G06Q 20/3827* (2013.01); *G06Q 40/02* (2013.01); *H04L 9/3231* (2013.01); *G06Q 20/4016* (2013.01); *G06V 40/1365* (2022.01)

(58) Field of Classification Search
CPC ........... G06Q 20/204; G06Q 20/38215; G06Q 20/385; G06F 16/2255; G06F 21/32; H04L 9/3231; H04L 9/3239; H04L 9/50; G06V 40/1365; G06V 40/12
See application file for complete search history.

(56) References Cited

U.S. PATENT DOCUMENTS

| | | | |
|---|---|---|---|
| 5,870,723 A | 2/1999 | Pare, Jr. et al. | |
| 6,012,039 A | 1/2000 | Hoffman et al. | |
| 6,230,148 B1 | 5/2001 | Pare, Jr. et al. | |
| 6,269,348 B1 | 7/2001 | Pare, Jr. et al. | |
| 6,270,011 B1 | 8/2001 | Gottfried | |
| 6,317,544 B1 | 11/2001 | Diehl et al. | |
| 6,581,042 B2 | 6/2003 | Pare, Jr. et al. | |
| 6,879,966 B1 | 4/2005 | Lapsley et al. | |
| 6,898,577 B1 | 5/2005 | Johnson | |
| 6,938,160 B2 | 8/2005 | Oono | |
| 6,950,810 B2 | 9/2005 | Lapsley et al. | |
| 6,985,608 B2 | 1/2006 | Hoffman et al. | |
| 7,110,987 B2 | 9/2006 | Engelhart | |
| 7,246,244 B2 | 7/2007 | Nanavati et al. | |
| 7,318,550 B2 | 1/2008 | Bonalle et al. | |
| 7,324,946 B2 | 1/2008 | Novack et al. | |
| 7,376,629 B1 | 5/2008 | McIsaac et al. | |
| 7,502,761 B2 | 3/2009 | Siegal et al. | |
| 7,519,558 B2 | 4/2009 | Ballard et al. | |
| 7,536,352 B2 | 5/2009 | Lapsley et al. | |
| 7,558,406 B1 | 7/2009 | Robinson et al. | |
| 7,565,329 B2 | 7/2009 | Lapsley et al. | |
| 7,620,605 B2 | 11/2009 | Hoffman et al. | |
| 7,631,193 B1 * | 12/2009 | Hoffman | ............... H04L 9/3231 726/4 |
| 7,970,678 B2 | 6/2011 | Lapsley et al. | |
| 7,997,477 B2 | 8/2011 | Robinson | |
| 8,073,756 B1 | 12/2011 | Lapsley et al. | |
| 8,082,154 B2 | 12/2011 | Novack et al. | |
| 8,214,652 B2 | 7/2012 | LaCous | |
| 8,443,202 B2 | 5/2013 | White et al. | |
| 8,452,680 B1 | 5/2013 | Lapsley et al. | |
| 8,463,710 B2 | 6/2013 | Hoffman et al. | |
| 8,485,442 B2 | 7/2013 | McNeal | |
| 8,630,932 B1 | 1/2014 | Lapsley et al. | |
| 8,630,933 B1 | 1/2014 | Lapsley et al. | |
| 8,762,276 B2 | 6/2014 | Lepisto et al. | |
| 8,768,776 B2 | 7/2014 | Belamant | |
| 8,799,167 B2 | 8/2014 | Carper | |
| 8,812,401 B2 | 8/2014 | Kendrick et al. | |
| 8,826,030 B2 | 9/2014 | White et al. | |
| 8,831,994 B1 | 9/2014 | Hoffman | |
| 8,930,276 B2 | 1/2015 | Thieme et al. | |
| 9,202,028 B2 | 12/2015 | White et al. | |
| 9,202,032 B2 | 12/2015 | White et al. | |
| 9,846,875 B2 | 12/2017 | McNeal | |
| 2002/0062291 A1 * | 5/2002 | Zoka | ................... G06Q 20/341 705/64 |
| 2003/0061172 A1 | 3/2003 | Robinson | |
| 2003/0105725 A1 | 6/2003 | Hoffman | |
| 2003/0163383 A1 | 8/2003 | Engelhart | |
| 2005/0160052 A1 | 7/2005 | Schneider et al. | |
| 2005/0248020 A1 | 11/2005 | Kato | |
| 2006/0265602 A1 | 11/2006 | Robinson | |
| 2006/0282395 A1 * | 12/2006 | Leibowitz | .......... G06Q 20/3674 705/67 |
| 2007/0156592 A1 | 7/2007 | Henderson | |
| 2007/0168290 A1 | 7/2007 | Robinson | |
| 2007/0198435 A1 | 8/2007 | Siegal et al. | |
| 2009/0228336 A1 | 9/2009 | Giordano et al. | |
| 2009/0228362 A1 | 9/2009 | Lapsley et al. | |
| 2010/0066493 A1 * | 3/2010 | Rachlin | ................... G06F 21/32 340/5.82 |
| 2010/0332400 A1 | 12/2010 | Etchegoyen | |
| 2011/0035321 A1 | 2/2011 | Ching | |
| 2012/0116918 A1 | 5/2012 | Andersson | |
| 2014/0337949 A1 * | 11/2014 | Hoyos | ................. H04L 63/0853 726/7 |
| 2015/0120547 A1 * | 4/2015 | Ghosh | ................ G06Q 20/4012 705/44 |
| 2015/0219046 A1 | 8/2015 | Weckerle | |
| 2015/0317627 A1 | 11/2015 | Howe | |
| 2016/0072800 A1 * | 3/2016 | Soon-Shiong | ......... G16B 50/00 726/7 |
| 2016/0196440 A1 * | 7/2016 | O'Hare | ................. H04L 9/3231 726/28 |
| 2016/0253658 A1 | 9/2016 | Beenau et al. | |
| 2017/0091774 A1 | 3/2017 | White | |
| 2017/0116602 A1 | 4/2017 | Chauhan | |
| 2017/0116603 A1 | 4/2017 | Bogaard | |

OTHER PUBLICATIONS

Security Vulnerabilities Against Fingerprint Biometric System—2018 (Year: 2018).
Cryptographic Attribute-Based Access Control (ABAC) for Secure Decision Making of Dynamic Policy With Multiauthority Attribute Tokens—2019 (Year: 2019).

* cited by examiner

400

(402) Obtaining, at a first device, an electronic representation of an initial biometric sampling of a registrant.

(404) Applying, at the first device or a device in electronic communication with the first device, the initial electronic representation of the biometric sampling to a template data construct to produce, through a first one-way hash function, an initial instance of a unique digital identifier (UDI).

(406) Storing the initial instance of the UDI at a biometric repository.

(408) Obtaining, from the registrant, a first plurality of account information constructs associated with the registrant that uniquely corresponds to an account held by the registrant with a third party.

(410) Generating, in electronic format, a unique secure identification number (SIN), through a second one-way hash function using (the instance of the UDI and the first plurality of account information constructs.

(412) Storing a unique link from the UDI to the first plurality of account information constructs in an indexed data structure different than the biometric repository.

(414) Receiving, from the registrant, both a request from the registrant for a service to be performed and an electronic representation of a second biometric sampling of the registrant.

(416) Forming a second instance of the UDI by applying the electronic representation of the second biometric sampling of the registrant to the template data construct through the first one-way hash function.

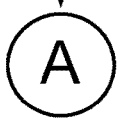

*(418)* Using the biometric repository to verify that the second instance of the UDI corresponds to the first instance of the UDI.

*(420)* Upon verification that the second instance of the UDI corresponds to the first instance of the UDI, reconstructing, for the request, the unique SIN from the second instance of the UDI, and using the reconstruction of the unique SIN to retrieve the first plurality of account information constructs using the indexed data structure.

*(422)* Transmitting the request for the service and the reconstructed unique SIN to the third party.

*(424)* Approving the request for service when the reconstructed unique SIN matches the third party records for the first plurality of account information constructs for the registrant and denying the request for service when the unique SIN fails to match the third party records of the first plurality of account information constructs for the registrant.

Receive a unique identifier from a registration device, the unique identifier being derived from a first biometric sample associated with a registrant using a derivation process, wherein the first biometric sample is captured by a biometric sample reader associated with the registration device and wherein the unique identifier is derived by the registration device by applying the derivation process
(502)

Receive account information associated with the registrant, wherein the account information corresponds to an account of the registrant with a financial institution; corresponding to the account information from the registration device and wherein and a secure identification number (SIN) is generated the SIN is associated with the biometric sample of the registrant in a biometric repository;
(504)

Store an association between the account information and the unique identifier in an index data structure
(506)

Receive a second biometric sample associated with the registrant from a biometric repository and transaction information corresponding to an attempted transaction of the registrant with a merchant, wherein the biometric repository is configured to receive the second biometric sample from a merchant computing device associated with the merchantand verify that the second biometric sample corresponds to a known biometric sample prior to transmitting the second biometric sample and wherein the secondbiometric sample matches the first biometric sample
(508)

Derive the unique identifier by applying the derivation process to the second biometric sample
(510)

Retrieve the account information associated with the unique identifier based at least in part on the unique identifier and the index data structure
(512)

Transmit the transaction information and the SIN corresponding to the retrieved account information to a computing device associated with the corresponding financial institution, wherein the computing device associated with the corresponding financial institution is configured to match the SIN to the account of the registrant and either approve or deny the attempted transaction
(514)

Figure 5

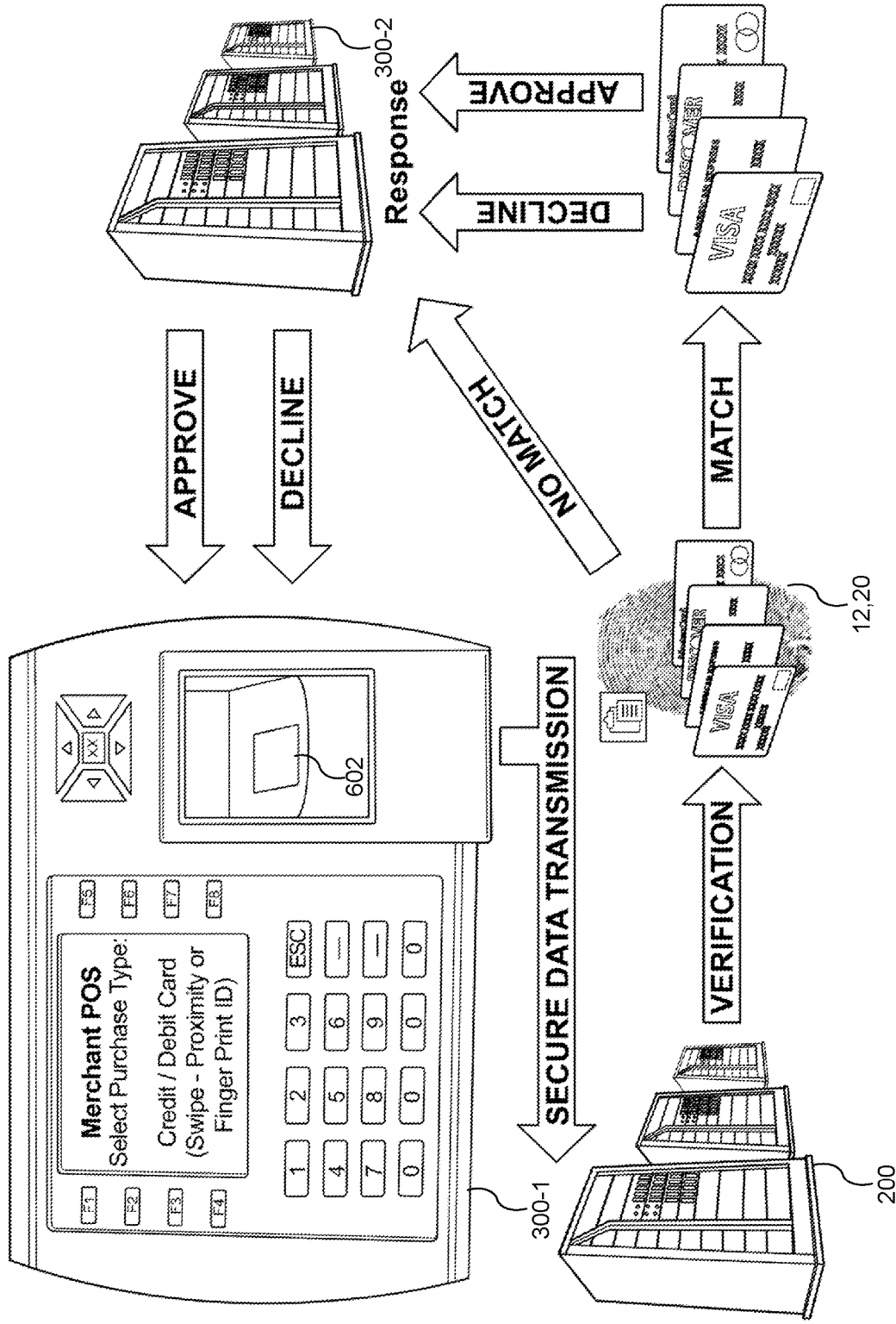

SYSTEMS AND METHODS FOR FACILITATING BIOMETRIC TOKENLESS AUTHENTICATION FOR SERVICES

CROSS-REFERENCE TO RELATED APPLICATIONS

The present Application is a continuation of U.S. patent application Ser. No. 17/306,765, entitled "Systems and Methods for Facilitating Biometric Tokenless Authentication for Services," filed May 3, 2021, which is a continuation-in-part of U.S. patent application Ser. No. 15/987,832, entitled "Biometric Secure Transaction System," filed May 23, 2018, which claims priority to U.S. Provisional Application No. 62/510,007, entitled "Biometric Secure Transaction System," filed May 23, 2017, each of which is hereby incorporated by reference in its entirety for all purposes.

TECHNICAL FIELD

The present disclosure relates to tokenless authentication. More particularly, the present disclosure relates to systems and methods for facilitating biometric tokenless authentication for services.

BACKGROUND

Crimes such as data breaches, credit card and debit card fraud, cell phone hacking and identity theft are increasing and are a significant problem in the commercial sector as well as for governments. There is thus a need for a method and system for reducing commercial and government "payment card" fraud, identity theft and other forms of data breach.

Current U.S. military and federal security operations are actively utilizing biometrics across all agencies and applications—especially in the areas of military security, border protection and immigration control, terrorism prevention and forensics, as well as criminal analysis. The programs utilize fingerprint technology, as well as voice analysis, facial recognition, DNA, and advanced biologic technologies. Government acceptance of fingerprint technology for conclusive identification has been established and is being accepted as an important part of the government's multi-modal system.

Conventionally, card issuers (and users) employ one of the following in person methodologies: swipe (magnetic stripes); near field technology; or chip and pin. For on-line purchases, card data is entered via digital transactions. Notwithstanding certain security approaches, all of these conventional methodologies are considered vulnerable to hacking, theft or impersonation and have not significantly reduced fraud or identity theft. One approach is "Apple Pay," that utilizes radiofrequency (RF) near-field technology. While Apple utilizes the user's fingerprint, that fingerprint only activates the internal phone process. The process can also be activated by the user's PIN, and Apple watch can only be activated that way. The user's fingerprint is not associated with the user's card data and cannot conclusively authenticate that the card holder made the transaction. Technologies such as "Apple Pay" utilize combined (unrelated) functions and technologies to be able to transact digital payments via RF signals (Bluetooth or similar technology) to another recipient—POS machine or other equipment (such as in "Bump" functionalities). In these methodologies user card data is resident in the phone and is accessed and transmitted utilizing the phone itself as the near field transmitter as opposed to using the credit/debit card itself. This technology then is also utilized for on-line payments or purchases—instead of manually entering the required card data.

In addition to the above types of resident equipment (cards and phones where user data is stored), the on-line internet world is utilizing various methodologies to conduct purchases and financial transactions. These include, PayPal, Venmo, American Express and other Payment Apps ("Serve," Pingit, ISIS), Barclay's "PayTag" (tag adhered to back of mobile phones), Wrist Bands ("PayBand") with embedded data, etc. where users tie their payment systems (cards, accounts) to this intermediary payment system.

The current payment technologies have the following drawbacks related to convenience and security, which the disclosed method and system are designed to eliminate Card use—must utilize the card in the transaction. Risk of a lost card or data/personally identifiable information ("PII") hacking or "interception" before or during use; card replacement with new account number.

There is thus a need for authenticating and implementing secured transactions be they financial, data-based or identity-based.

There is also a need for authenticating and implementing secured transactions outside financial use.

There is also a need for vehicle authentication to activate the vehicle ignition without using a key.

There is also a need for facilitating a request for service that does not require or rely on any additional tokens or devices that are stored or used, all of which are subject to being hacked, intercepted, stolen and typically utilized in ID theft/fraud.

SUMMARY

Given the above background, what is needed in the art are systems and methods for providing tokenless authentication of a request for service.

The present disclosure provides improved systems and methods directed to authenticating and implementing secured requests for services using biometrics as a service. Accordingly, in some embodiments, the systems and methods of the present disclosure provide an out-of-band tokenless biometric authorization system that is utilized in environments where secure, conclusive, and authenticated identity is necessary or required. In some embodiments, the biometric authorization system obtains an electronic representation of a respective biometric sampling from a registrant, in which the respective biometric sampling includes one or more fingerprints, one or more handprints, a face print, one or more voice prints (e.g., auditory utterances by the registrant), one or more retinal image captures, one or more uniquely identifying characteristics of the registrant, or a combination thereof.

As such, in some embodiments, the systems and methods of the present disclosure combine the use of biometric sampling mechanisms that are augmented with multi-modal security to create a process that significantly reduces or eliminates the ability or opportunity to commit fraud. Additionally, the systems and methods of the present disclosure help reduce or eliminate identity theft. Furthermore, the systems and methods of the present disclosure provide a secure, conclusive transaction authentication system. Moreover, the systems and methods of the present disclosure provide a robust, scalable system that is adaptable to multi-applications and platforms (including "open" environment systems, such as commercial retail services, and "closed"

environment systems with limited participants, such as educational entity environments, and government services). Furthermore, in some embodiments, the systems and methods of the present disclosure require no change in process or require any capital expenditure for the registrant or the service provider.

An aspect of the present disclosure is directed to providing systems and methods for multi-modality security with encryption and authentication mechanisms to ensure that the systems and methods are internally and externally secure. Moreover, the systems and methods of the present disclosure ensure that personally identifiable information ("PIP") is not transmitted in the merchant purchase process or identity verification process. The systems and methods of the present disclosure allow a registrant to register a biometric sampling (e.g., a fingerprint) within a single point of entrance dual repository system (e.g., account repository and biometric repository of a biometric authentication system). Each registrant is assigned a unique secure identifying number (SIN), which is utilized to identify and associate the registrant to an account held by the registrant with a third party. Accordingly, the registrant utilizes only a biometric sampling at a client device to facilitating a request for service, such as a transaction or other non-financial transaction. In some embodiments, the systems and methods of the present disclosure utilize both the biometric repository and the account repository with redundant fail-over capabilities. The biometric repository 20 includes an electronic representation of the biometric sampling or an initial instance of a unique digital identifier (UDI). The account repository 12 includes the unique SIN and the plurality of account information constructs provided by the registrant. Both of the account repository and the biometric repository are secured by the military-grade guards.

In some embodiments, the systems and methods of the present disclosure is utilized in any financial transaction utilizing a credit/debit card or in other types of transactions where positive individual identification is required.

In some embodiments, the systems and methods of the present disclosure operate without modification within various non-financial multi-platform environments and applications such as an educational, medical and patient identity control and real estate transactions, in order to securely control and authenticate all transactions.

Moreover, in some embodiments, the systems and methods of the present disclosure the disclosed method and system can also be used for vehicle authentication for to activate the vehicle ignition without using a key or other apparatus or token.

In more detail, one aspect of the present disclosure is directed to providing a method for tokenless authentication. The method includes obtaining, at a first device, an electronic representation of an initial biometric sampling of a registrant. The method further includes applying, at the first device or a device in electronic communication with the first device, the initial electronic representation of the biometric sampling to a template data construct to produce, through a first one-way hash function, an initial instance of a unique digital identifier (UDI). From this, the method includes storing the initial instance of the UDI at a biometric repository. The method includes obtaining, from the registrant, a first plurality of account information constructs associated with the registrant that uniquely corresponds to an account held by the registrant with a third party. As such, the method includes generating, in electronic format, a unique secure identification number (SIN), through a second one-way hash function, using the instance of the UDI and the first plurality of account information constructs. Accordingly, the method includes storing a unique link from the UDI to the first plurality of account information constructs in an indexed data structure different than the biometric repository. Additionally, the method includes receiving, from the registrant, both a request from the registrant for a service to be performed and an electronic representation of a second biometric sampling of the registrant. Moreover, the method includes forming a second instance of the UDI by applying the electronic representation of the second biometric sampling of the registrant to the template data construct through the first one-way hash function. The method includes using the biometric repository to verify that the second instance of the UDI corresponds to the first instance of the UDI. Upon verification that the second instance of the UDI corresponds to the first instance of the UDI, the method includes reconstructing, for the request, the unique SIN from the second instance of the UDI, and using the reconstruction of the unique SIN to retrieve the first plurality of account information constructs using the indexed data structure. Additionally, the method includes transmitting the request for service and the reconstructed unique SIN to the third party. From this, the method includes approving the request for service when the reconstructed unique SIN matches the third party records for the first plurality of account information constructs for the registrant and denying the request for service when the unique SIN fails to match the third party records of the first plurality of account information constructs for the registrant.

In some embodiments, the first device includes a biometric sample reader configured to capture the initial biometric sampling from a fingerprint.

In some embodiments, each instance of the UDI and the first plurality of account information constructs associated with the registrant are encrypted. In accordance with a determination that each instance of the UDI and the first plurality of account information constructs are encrypted, for the obtaining thereof, the method further includes decrypting the UDI and the first plurality of account information constructs associated with the registrant.

In some embodiments, the biometric repository is configured to generate the unique SIN.

In some embodiments, the biometric repository utilizes a quantum random number generator to generate the unique SIN.

In some embodiments, for each electronic representation of a respective biometric sampling, the method further includes identifying, based on a corresponding electronic representation of the respective biometric sampling, a corresponding characteristic of the respective biometric sampling. The method further includes translating the corresponding characteristic of the respective biometric sampling into the template data construct.

In some embodiments, the corresponding characteristic of the respective biometric sampling is a visual identifying characteristic of the respective biometric sampling.

In some embodiments, the unique digital template includes a coordinate mapping of the corresponding characteristic.

In some embodiments, the second one-way hash function includes assigning a respective alphanumeric character to the corresponding characteristic.

In some embodiments, the data size of the unique digital template is less than the data size of an electronic representation of the respective biometric sampling.

In some embodiments, the indexed data structure is stored, at least in part, on an account repository that is remote from the biometric repository.

In some embodiments, the account repository stores the unique SIN.

In some embodiments, the method further includes, in response to the retrieving the first plurality of account information constructs, further retrieving the unique SIN based on the retrieved first plurality of account information constructs.

In some embodiments, prior to receiving the UDI from the first device, the UDI is formed by the first device by applying a derivation process to the respective biometric sampling.

In some embodiments, the derivation process of the first instance of the unique digital identifier is conducted by the first device.

In some embodiments, the derivation process of the first instance of the unique digital identifier is conducted by the computer system.

In some embodiments, the method further includes transmitting, to the third party the unique SIN and the UDI.

In some embodiments, the transmitting includes forming a data construct includes a digital stenography of the unique SIN and the UDI.

Another aspect of the present disclosure is directed to providing a non-transitory computer readable storage medium. The non-transitory computer readable storage medium stores one or more programs, the one or more programs includes instructions, which when executed by a computer system cause the computer system to perform a method. The method includes obtaining, at a first device, an electronic representation of an initial biometric sampling of a registrant. The method further includes applying, at the first device or a device in electronic communication with the first device, the initial electronic representation of the biometric sampling to a template data construct to produce, through a first one-way hash function, an initial instance of a unique digital identifier (UDI). From this, the method includes storing the initial instance of the UDI at a biometric repository. The method includes obtaining, from the registrant, a first plurality of account information constructs associated with the registrant that uniquely corresponds to an account held by the registrant with a third party. As such, the method includes generating, in electronic format, a unique secure identification number (SIN), through a second one-way hash function using (i) the instance of the UDI and (ii) the first plurality of account information constructs. Accordingly, the method includes storing a unique link from the UDI to the first plurality of account information constructs in an indexed data structure different than the biometric repository. Additionally, the method includes receiving, from the registrant, both a request from the registrant for a service to be performed and an electronic representation of a second biometric sampling of the registrant. Moreover, the method includes forming a second instance of the UDI by applying the electronic representation of the second biometric sampling of the registrant to the template data construct through the first one-way hash function. The method includes using the biometric repository to verify that the second instance of the UDI corresponds to the first instance of the UDI. Upon verification that the second instance of the UDI corresponds to the first instance of the UDI, the method includes reconstructing, for the request, the unique SIN from the second instance of the UDI, and using the reconstruction of the unique SIN to retrieve the first plurality of account information constructs using the indexed data structure. Additionally, the method includes transmitting the request for service and the reconstructed unique SIN to the third party. From this, the method includes approving the request for service when the reconstructed unique SIN matches the third party records for the first plurality of account information constructs for the registrant and denying the request for service when the unique SIN fails to match the third party records of the first plurality of account information constructs for the registrant.

Yet another aspect of the present disclosure is directed to providing a computer system for tokenless authorization. The computer system includes one or more processors, and a memory coupled to the one or more processors. The memory includes one or more programs configured to be executed by the one or more processors to perform a method. The method includes obtaining, at a first device, an electronic representation of an initial biometric sampling of a registrant. The method further includes applying, at the first device or a device in electronic communication with the first device, the initial electronic representation of the biometric sampling to a template data construct to produce, through a first one-way hash function, an initial instance of a unique digital identifier (UDI). From this, the method includes storing the initial instance of the UDI at a biometric repository. The method includes obtaining, from the registrant, a first plurality of account information constructs associated with the registrant that uniquely corresponds to an account held by the registrant with a third party. As such, the method includes generating, in electronic format, a unique secure identification number (SIN), through a second one-way hash function using (i) the instance of the UDI and (ii) the first plurality of account information constructs. Accordingly, the method includes storing a unique link from the UDI to the first plurality of account information constructs in an indexed data structure different than the biometric repository. Additionally, the method includes receiving, from the registrant, both a request from the registrant for a service to be performed and an electronic representation of a second biometric sampling of the registrant. Moreover, the method includes forming a second instance of the UDI by applying the electronic representation of the second biometric sampling of the registrant to the template data construct through the first one-way hash function. The method includes using the biometric repository to verify that the second instance of the UDI corresponds to the first instance of the UDI. Upon verification that the second instance of the UDI corresponds to the first instance of the UDI, the method includes reconstructing, for the request, the unique SIN from the second instance of the UDI, and using the reconstruction of the unique SIN to retrieve the first plurality of account information constructs using the indexed data structure. Additionally, the method includes transmitting the request for service and the reconstructed unique SIN to the third party. From this, the method includes approving the request for service when the reconstructed unique SIN matches the third party records for the first plurality of account information constructs for the registrant and denying the request for service when the unique SIN fails to match the third party records of the first plurality of account information constructs for the registrant.

The systems and methods of the present disclosure have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 4A and 4B collectively provide a flow chart of methods for tokenless authentication, in which dashed boxes represent optional elements in the flow chart, in accordance with an embodiment of the present disclosure;

FIG. 5 provides another flow chart of methods for tokenless authentication, in which dashed boxes represent optional elements in the flow chart, in accordance with an embodiment of the present disclosure;

FIG. 6 illustrates a schematic view of a biometric authentication system and a population of client devices, in accordance with an embodiment of the present disclosure;

Figure 1:
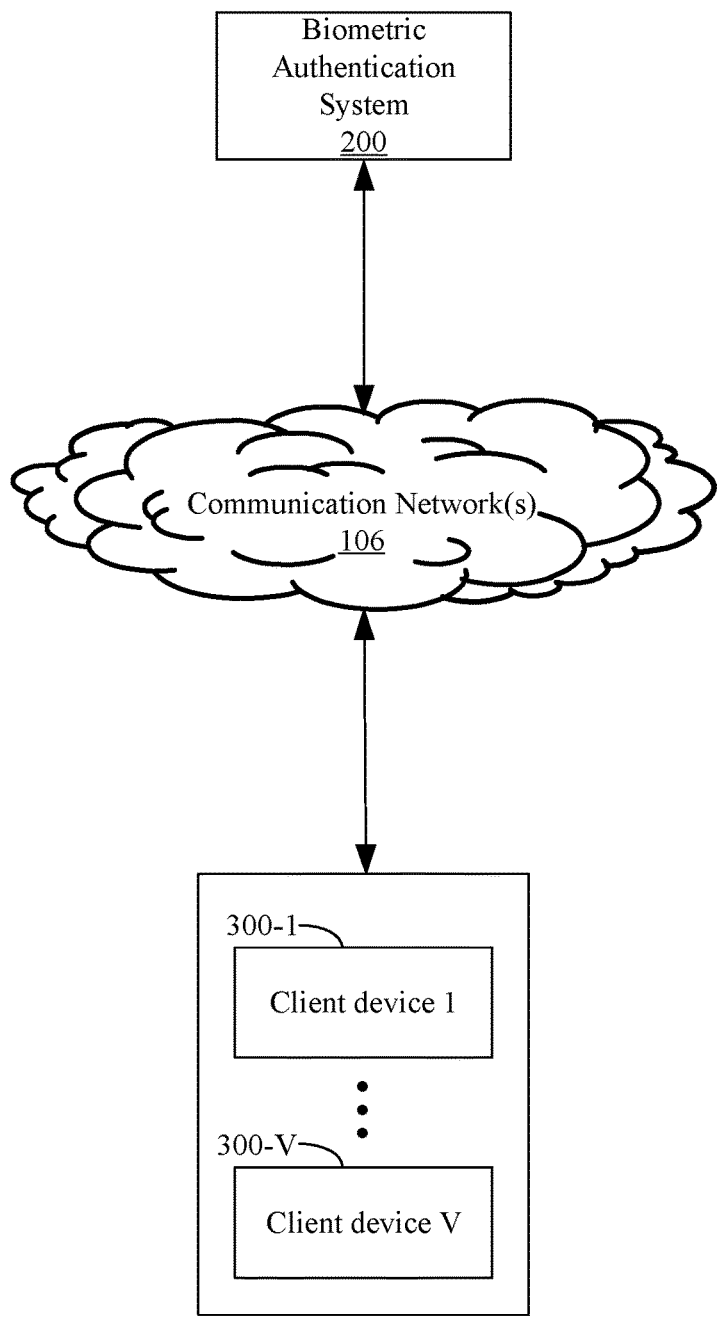
FIG. 1 illustrates an exemplary system topology including a biometric authentication system and a population of client devices, in accordance with an embodiment of the present disclosure.

In the figures, reference numbers refer to the same or equivalent parts of the present invention throughout the several figures of the drawing.

DETAILED DESCRIPTION

Systems and methods for tokenless authorization are provided. An electronic representation of an initial biometric sampling of a registrant is obtained. The initial electronic representation of the biometric sampling is applied to a template data construct to produce, through a first one-way hash function, an initial instance of a unique digital identifier (UDI). The initial instance of the UDI is stored at a biometric repository. A first plurality of account information constructs associated with the registrant that uniquely corresponds to an account held by the registrant with a third party is obtained. A unique secure identification number (SIN) is generated through a second one-way hash function using the instance of the UDI and the first plurality of account information constructs. A unique link from the UDI to the first plurality of account information constructs is stored in an indexed data structure different than the biometric repository. There is received, from the registrant, both a request from the registrant for a service to be performed and an electronic representation of a second biometric sampling of the registrant. A second instance of the UDI is formed by applying the electronic representation of the second biometric sampling of the registrant to the template data construct through the first one-way hash function. The biometric repository is used to verify that the second instance of the UDI corresponds to the first instance of the UDI. Upon verification that the second instance of the UDI corresponds to the first instance of the UDI, there is reconstructed, for the request, the unique SIN from the second instance of the UDI. This reconstruction of the unique SIN is used to retrieve the first plurality of account information constructs using the indexed data structure. The request for service and the reconstructed unique SIN are then transmitted to the third party. The request for service is approved when the reconstructed unique SIN matches the third party records for the first plurality of account information constructs for the registrant and denying the request for service when the unique SIN fails to match the third party records of the first plurality of account information constructs for the registrant.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For instance, a biometric sampling could be termed a second biometric sampling, and, similarly, a second biometric sampling could be termed a first biometric sampling, without departing from the scope of the present disclosure. The first biometric sampling and the second biometric sampling are both biometric samplings, but they are not the same biometric sampling.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about" means within an acceptable error range for the particular value. The term "about" can have the meaning as commonly understood by one of ordinary skill in the art. The term "about" can refer to ±10%. The term "about" can refer to ±5%.

As used herein, the term "dynamically" means an ability to update a program while the program is currently running.

Additionally, the terms "client," "subject," and "user" are used interchangeably herein unless expressly stated otherwise.

Furthermore, when a reference number is given an "$i^{th}$" denotation, the reference number refers to a generic component, set, or embodiment. For instance, a client device termed "client device i" refers to the $i^{th}$ client device in a plurality of client devices (e.g., a client device 300-$i$ in a plurality of client devices 300).

In the present disclosure, unless expressly stated otherwise, descriptions of devices and systems will include implementations of one or more computers. For instance, and for purposes of illustration in FIG. 1, a client device 300 is represented as single device that includes all the functionality of the client device 300. However, the present disclosure is not limited thereto. For instance, the functionality of the client device 300 may be spread across any number of networked computers and/or reside on each of several networked computers and/or by hosted on one or more virtual machines and/or containers at a remote location accessible across a communications network (e.g., communications network 106). One of skill in the art will appreciate that a wide array of different computer topologies is possible for the client device 300, and other devices and systems of the preset disclosure, and that all such topologies are within the scope of the present disclosure.

FIG. 1 depicts a block diagram of a distributed client-server system (e.g., distributed client-server system 100) according to some embodiments of the present disclosure. The system 100 facilitates tokenless authentication of a request for service. The system 100 facilitates obtaining a biometric sampling of a registrant, such as a user of a client device (e.g., client device 300 of FIG. 3) in order to facilitate authentication of a request by the user for a service.

Aspects of the present disclosure are directed to providing systems and methods that facilitate a multi-application, military standard, secure, biometric based authentication service. The systems and methods of the present disclosure link consumers (e.g., registrants), retailers, and financial institutions together by providing a multi-tiered secure request for service platform. Additionally, the systems and methods of the present disclosure reduce levels of fraud and identity theft. In the various embodiments, the biometric samplings utilized by the systems and methods of the present disclosure include one or more fingerprints, one or more handprints, one or more voice prints, one or more retinal images, or other uniquely identifying characteristics. Accordingly, in some embodiments, the systems and methods of the present disclosure is used for both financial and non-financial services, such as purchasing a good, authorizing ignition of a vehicle, and the like.

In some embodiments, in an effort to curb fraud, the systems and methods of the present disclosure eliminate the use of a physical card or other token mechanism, and utilizes biometric samplings that is a uniquely identifiable, secure authentication mechanism. In some embodiments, the biometric sampling utilized by the systems and methods of the present disclosure includes one or more fingerprints of a registrant. However, the present disclosure is not limited thereto. The systems and methods of the present disclosure eliminate the possibility of personally identifiable information ("PII") theft, whether it occurs point of facilitating a request for service, from loss of access to a client device, thereby, significantly reducing the possibility of incidents of fraud. Additionally, in some embodiments, the systems and methods of the present disclosure is used without a necessity of using or possessing a physical card or other apparatus such as a mobile phone. The systems and methods of the present disclosure incorporate and maximize multimodal technology, including contactless biometric sampling capture. The systems and methods of the present disclosure utilize a multimodality security mechanism with encryption, out-of-band tokenization authentication techniques (transaction-specific security), and data guards to ensure that the PII of the registrant is not disclosed during the request for service process. For instance, in some embodiments, registrant account information is registered and verified by a third party and then is maintained encrypted in two separate, but co-located repositories (e.g., an account repository and a biometric repository) that is each protected by secure guards with a single point of entry. In some embodiments, each repository includes redundant safeguard mechanisms for fail-over. As such. the systems and methods of the present disclosure eliminate the possibility of theft or other fraudulent intrusion through the use of both the account repository and the biometric repository, and utilize secure transmission of data from a client device to the account repository further reducing the possibility of obtaining any account information, even in the instance of a hacking at the client device or the biometric authentication system. In some embodiments, the systems and methods of the present disclosure us a local biometric sample reader in electronic communication with the client device to register the account information into the account repository, utilizing the same secure technologies, thus, eliminating current insecure PII PC-based storage and transmission.

In some embodiments, the systems and methods of the present disclosure eliminate the need for any card issuer to alter its physical cards, methods of issuance, or processing payments. Thus, there is no requirement for capital expenditures on their part. In this way, the systems and methods of the present disclosure provide significant layers of additional security protection for all parties—registrants, retailers, and third parties (e.g., account issuers). In some embodiments, the systems and methods of the present disclosure provide encryption at registration and via the client device. In some embodiments, the systems and methods of the present disclosure provide separate repositories: an account repository for account information constructs obtained from the registrant and a biometric repository for data associated with a biometric sampling (e.g., a unique digital identifier produced from an electronic representation of the biometric sampling) with a single point of entry (e.g., a biometric authentication system). In some embodiments, the systems and methods of the present disclosure provide security guards for each repository to prevent hacking, interception, and infiltration. Furthermore, in some embodiments, the systems and methods of the present disclosure provide predictive analytics and challenges for registrant security and positive registrant authentication.

The use of the UDIs produced from the electronic representations of biometric samplings reduces operational costs for account issuers (for theft, fraud, card re-issuance, technology refresh, CAPEX for hardware replacement and improvement, etc.), eliminates the need for PINs or other token verification processes, and serves as conclusive registrant authorization. As such, a use of the systems and methods of the present disclosure is by government entities in distribution of all forms of public financial assistance payments, or other cash payments to beneficiaries or other government recipients, to reduce fraudulent use (e.g., the systems and methods of the present disclosure track who uses the assigned funds, and eliminate the recipient's improper use or sale of the cards, etc.).

In some embodiments, the systems and methods of the present disclosure is used by individual account holders (registrants), account issuers (third parties), government entities, or a combination thereof who utilize service systems. In some embodiments, the systems and methods of the present disclosure is utilized, without change, in other government applications where fraud and ID security are critical, such as: passport and immigration control; Medicare/Medicaid authorization; IRS and Social Security authentication; student loans; voting and voter registration.

In some embodiments, such as a non-government market, the systems and methods of the present disclosure is used for secure vehicle authentication to start a vehicle.

Accordingly, the systems and methods of the present disclosure address the vast numbers of electronic payment mechanisms in circulation; wide-spread fraud, misuse, and security issues related to the issuance and use of the payment mechanisms; significant costs incurred annually by users, account issuers (financial institutions and retailers), and the national economy as a result of the aforementioned issues; lack of systematic security that contributes to increased loss; and the like.

In some embodiments, a processing time for approving a request for service using the systems and methods of the present disclosure is configured such that the processing time will not exceed competitive processing times.

The systems and methods of the present disclosure are configured to meet U.S. government and industry standards. Military standard encryption, predictive analytics and data guards are used in by the systems and methods of the present disclosure. Moreover, the systems and methods of the present disclosure are designed and configured with encryption, biometric sampling capture capabilities, biometric sampling recognition modules, and predictive analytics.

As such, a system 100 facilitates providing tokenless authentication (e.g., method 400 of FIGS. 4A and 4B, method 500 of FIG. 5, etc.) for a population of users (e.g., client devices 300). In some embodiments, the population of users includes a first user that is a registrant and a second user that is a third party of the system.

Of course, other topologies of the system 100 are possible. For instance, in some embodiments, any of the illustrated devices and systems can in fact constitute several computer systems that are linked together in a network or be a virtual machine and/or container in a cloud-computing environment. Moreover, rather than relying on a physical communication network 106, the illustrated devices and systems may wirelessly transmit information between each other. As such, the exemplary topology shown in FIG. 1 merely serves to describe the features of an embodiment of the present disclosure in a manner that will be readily understood to one of skill in the art.

Referring to FIG. 1, in some embodiments, a distributed client-server system 100 includes a biometric authentication system 200 that facilitates providing tokenless authentication for one or more client devices 300 (e.g., a first client device 300-1, a second client device 300-2, . . . , a $V^{th}$ client device 300-V, etc.), hereinafter "client device," each of which is associated with at least one corresponding user (e.g., a registrant using a first client device 300-1 to interact with the biometric authentication system 200).

In some embodiments, the communication network 106 optionally includes the Internet, one or more local area networks (LANs), one or more wide area networks (WANs), other types of networks, or a combination of such networks. Examples of communication networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Now that a distributed client-server system 100 has generally been described, an exemplary biometric authentication system 200 for providing tokenless authentication will be described with reference to FIG. 2.

In various embodiments, the biometric authentication system 200 includes one or more processing units (CPUs) 274, a network or other communications interface 284, and memory 292.

Memory 292 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 292 may optionally include one or more storage devices remotely located from the CPU(s) 274. Memory 292, or alternatively the non-volatile memory device(s) within memory 292, includes a non-transitory computer readable storage medium. Access to memory 292 by other components of the biometric authentication system 200, such as the CPU(s) 274, is, optionally, controlled by a controller. In some embodiments, memory 292 can include mass storage that is remotely located with respect to the CPU(s) 274. In other words, some data stored in memory 292 may in fact be hosted on devices that are external to the biometric authentication system 200, but that can be electronically accessed by the biometric authentication system 200 over an Internet, intranet, or other form of network 106 or electronic cable using communication interface 284.

In some embodiments, the memory 292 of the biometric authentication system 200 for providing tokenless authentication stores:

an operating system 8 (e.g., ANDROID, iOS, DARWIN, RTXC, LINUX, UNIX, OS X, WINDOWS, or an embedded operating system such as VxWorks) that includes procedures for handling various basic system services;

an electronic address 10 associated with the biometric authentication system 200 that identifies the biometric authentication system 200;

an account repository 12 that stores a plurality of unique secure identification numbers (SIN) 16 and a plurality of account information constructs 18 which are linked through an indexed data structure 14;

a biometric repository 20 that includes a plurality of unique digital identifiers (UDI) 22, each UDI 22 formed from a respective biometric sampling; and a biometric sampling processing module 24 that facilitates processing an electronic representation of a respective biometric sampling by utilizing a hash function library 26 including a plurality of hash functions 28 with a template data construct 30.

An electronic address 10 is associated with the biometric authentication system 200. The electronic address 10 is utilized to at least uniquely identify the biometric authentication system 200 from other devices and components of the distributed system 100 (e.g., uniquely identify biometric authentication system 200 from first client device 300-1 of a registrant user and second client device 300-2 of a third party user). For instance, in some embodiments, the electronic address 10 is utilized obtain an electronic representation of a respective biometric sampling from a client device 300.

An account repository 12 stores a plurality of unique SINs (e.g., first SIN 16-1, second SIN 16-2, . . . , SIN R 16-R). Each unique SIN 16 is generated from an electronic representation of an initial biometric sampling of a corresponding registrant (e.g., first user of first client device 300-1). Specifically, each unique SIN 16 is produced through a one-way hash function (e.g., second one-way hash function 28-2 of FIG. 2), which uses a respective instance of a UDI 22. In some embodiments, the second one-way hash function 28-2 that produces a respective unique SIN 16 is applied to a template data construct 30 that produces a digital mapping of the electronic representation of the initial biometric sampling in the form of the UDI 22. In some embodiments, the template data construct 30 produces a digital mapping that includes a plurality of reference points determined from the electronic representation of the initial biometric sampling. In such embodiments, each reference point in the plurality of reference points is provided a corresponding alphanumeric character in a string of characters. As a non-limiting example, in some embodiments, each unique SIN 16 includes a string of alphanumeric characters. In some embodiments, the string of alphanumeric characters includes 5 characters, 6 characters, 7 characters, 8 characters, 9 characters, 10 characters, 12 characters, 14 characters, 16 characters, 18 characters, 20 characters, 22 characters, 24 characters, 26 characters, 28 characters, 30 characters, or a combination thereof. By way of example, in some embodiments, each unique SIN 16 includes a string of 6 alphanumeric characters. Accordingly, a first registrant is generated a first unique SIN 16-1 by applying a first electronic representation of an initial biometric sampling of the first registrant to a template data construct 30 through a first one-way hash function 28-1, such that the first unique SID 16-1 includes a first string of alphanumeric characters of AB12C3. Moreover, a second registrant is generated a second unique SIN 16-2 by applying a second electronic representation of an initial biometric sampling of the second registrant to the template data construct 30 through the first one-way hash function 28-1, such that the second unique SID 16-2 includes a second string of alphanumeric characters of 1ABCD2. However, the present disclosure is not limited thereto. In some embodiments, the second one-way hash function 28-2 is further applied to the first plurality of account information constructs 18-1 with the UDI 22 to generate the unique SIN 16. In this way, not only is the initial biometric sampling through which the UDI 22 is produced from used to generate the unique SID 22, but also the first plurality of account information constructs 18-1 is used to generate the unique SIN 16, which allows for tailoring the unique SIN 16 to the first plurality of account information constructs 18-1. For instance, consider the first registrant having a first account held with a first party that is associated with a first account information construct 18-1 and a second account held with a second party different than the first party. Accordingly, the second one-way hash function generates a first unique SIN 16-1 associated with the first account held with the first party and a second unique SIN 26-2 associated with the second account held with the second party from the initial instance of the UDI 22 with the first plurality of account information constructs 18-1.

Each unique SIN 16 in the plurality of unique SINs 16 is linked to a corresponding account information construct 18 in the plurality of account information constructs 18 through an indexed data structure 14. The indexed data structure 14 facilitates storing a unique link between a respective unique SIN 16 and the corresponding account information construct 18. In this way, the indexed data structure 14 provides security at the account repository 12 by providing a layer of removable between the respective unique SIN 16 and the corresponding account information construct.

Additionally, the account repository 12 includes a plurality of account information constructs 18 (e.g., first account information construct 18-1, second account information construct 18-2, . . . , account information construct 18-S). Each respective account information construct 18 corresponds to an account held by a corresponding registrant with a third party (e.g., second user of second client device 300-2.). In this way, each registrant of the biometric authentication system 200 is associated with one or more account information constructions in the plurality of account information constructs 18. However, the present disclosure is not limited thereto. For instance, in some embodiments, a respective account information construct 18 in the plurality of account information constructs 18 associated with the registrant includes an account number and a routing number associated with the account held by the corresponding registrant with the third party. In some embodiments, the respective account information construct 18 includes a payment card number, such as a primary account number, an expiration date, a security code number, and the like. In some embodiments, the respective account information construct 18 includes a physical address associated with the registrant. In some embodiments, the respective account information construct 18 includes an identification number associated with the corresponding registrant, such as membership number, a subscription number, or a combination thereof. In some embodiments, the respective account information construct 18 includes a blockchain public key, a blockchain private key, a blockchain wallet address, or a combination thereof. However, the present disclosure is not limited thereto. In some embodiments, the first plurality of account information constructs 18-1 obtained from a registrant includes a first account information construct 18-1 that is associated with PII and a second account information construct 18-2 that is associated with non-PII. In such embodiments, the biometric authentication system 200 discards the second account information construct 18-2, which allows for an identity of the registrant to remain anonymous when obtaining and/or transmitting data via the biometric authentication system 200.

The biometric authentication system 200 includes a biometric repository 20, which is different than the account repository 12. By utilizing the biometric repository 20 that is mutually exclusive from the account repository 12, the biometric authentication system 20 is provided with an increased level of security should one of the account repository 12 or the biometric repository 20 become compromised. The biometric repository 20 stores information associated with a biometric sampling of a registrant. For instance, in some embodiments, the biometric repository 20 stores the electronic representation of the initial biometric sampling of the registrant. However, the present disclosure is not limited thereto. In some embodiments, the biometric repository 20 stores a UDI 22 that is produced from the electronic representation of the initial biometric representation. Specifically, the UDI 22 is produced by applying by a template data construct 30.

In some embodiments, the biometric authentication system 200 includes a biometric sampling processing module 24, which facilitates applying a respective electronic representation of a biometric sampling to a template data construct 30 and/or processing a UDI 22 obtained from a client device 300. In some embodiments, the biometric sampling processing module 24 facilitates reconstructing a unique SIN 16 from an instance of a UDI 22. In some embodiments, the biometric sampling process module 24 is in communication (e.g., via bus 212) with a biometric sample reader (e.g., biometric sample reader 600 of FIG. 6) that is configured to obtain an electronic representation of a respective biometric sampling from a registrant and process the electronic representation of the respective biometric sampling. Accordingly, the biometric sampling processing module 24 includes a hash function library 26 that stores a plurality of one-way hash functions (e.g., first one-way hash function 28-1, second one-way hash function 28-2, . . . , one-way hash function U 28-U). Each one-way hash function 28 produces a unique construct that is utilized by the biometric authentication system 200 for facilitating tokenless authentication. Specifically, each one-way hash function 28 is a cryptographic hash function that provides transforming a data set (e.g., an electronic representation of a respective biometric sampling 20) into a non-invertible transferred data set, such as an array. In this way, each respective one-way hash function 28 is a unique cryptographic hash function that produces a unique output, such as a UDI 22 or a unique SIN 16, from an input. Accordingly, in some embodiments, when applying an initial input (e.g., an electronic representation of an initial biometric sampling, an initial instance of an UDI 22, block 404 of FIG. 4A, block 410 of FIG. 4A, etc.) to a respective one-way hash function 28, the respective one-way hash function 28 produces a unique output (e.g., instance of UDI 22, unique SIN 16), such that the unique output cannot be produce for two different registrants. In this way, the one-way hash functions 28 prevent the biometric authentication system 200 from providing a first registrant and a second registrant from accidentally having the same UDI 22 and/or unique SIN 16, which would at least in part allow the first registrant to act as the second registrant within the system 100. In some embodiments, when applying a second input (e.g., an electronic representation of a second biometric sampling, a second instance of an UDI 22, block 416 of FIG. 4A, block 420 of FIG. 4A, etc.) to the respective one-way hash function 28, the respective one-way hash function 28 reconstructs an identical, or substantially identical, output (e.g., instance of UDI 22, unique SIN 16), such that the initial input and the second input from the same registrant provide a reconstruction of the same output produced by the initial input. In this way, each instance of a respective UDI 22 produced from an electronic representation of a respective biometric sampling from a first registrant will produce the same UDI 22. In some embodiments, a first one-way hash function 28-1 it configured to producing a UDI 22 with the respective electronic representation of the biometric sampling. In some embodiments, a second one-way hash function 28-2 is configured to generate a unique SIN 16 with an instance of a UDI 22 and, optionally, a respective account information construct 18. Additional details and information regarding a use of one-way hash functions can be found at Mukundan et al., 2017, "Hash-One: A Lightweight Cryptographic Hah Function," IET Information Security, 10(5), pg. 225, which is hereby incorporated by reference in its entirety.

The biometric sampling processing module 24 includes at least one template data construct 30. Each template data construct 30 provides a standardize mechanism for transforming an electronic representation of a respective biometric sampling into an instance of a UDI 22. In some embodiments, a template data construct 30 is unique to type of biometric sampling provide by a registrant. As a non-limiting example, a first template data construct 30-1 is used for a fingerprint biometric sampling whereas a second template data construct 30-2 is used for a facial biometric sampling. However, the present disclosure is not limited thereto. Additional details and information regarding a template data construct 30 can be found at Rokbani et al., 2005, "Fingerprint Identification Using Minutiae Constellation Matching," IADIS Virtual Multi Conference on Computer Science and Information Systems, pg. 157; Bourgeat et al., 2014, "New Algorithmic Approaches to Point Constellation Recognition," IFIP International Information Security Conference," pg. 80, each of which is hereby incorporated by reference in its entirety.

Each of the above identified modules and applications correspond to a set of executable instructions for performing one or more functions described above and the methods described in the present disclosure (e.g., the computer-implemented methods and other information processing methods described herein; method 400 of FIGS. 4A and 4B; method 500 of FIG. 5, etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 292 optionally stores a subset of the modules and data structures identified above. Furthermore, in some embodiments, the memory 292 stores additional modules and data structures not described above.

Figure 2:
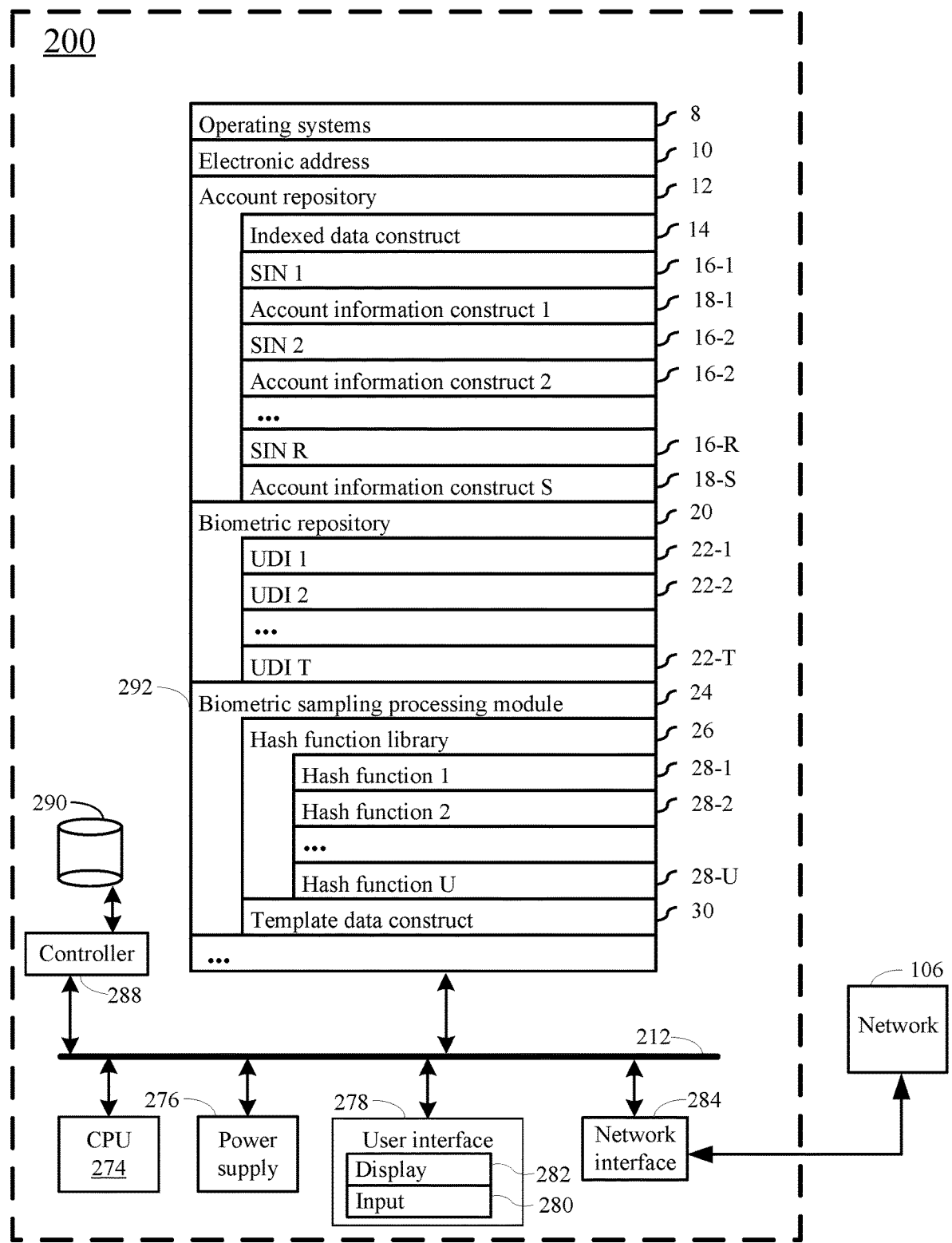
FIG. 2 illustrates various modules and/or components of a biometric authentication system, in accordance with an embodiment of the present disclosure.

It should be appreciated that the biometric authentication system 200 of FIG. 2 is only one example of a biometric authentication system 200, and that the biometric authentication system 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Figure 3:
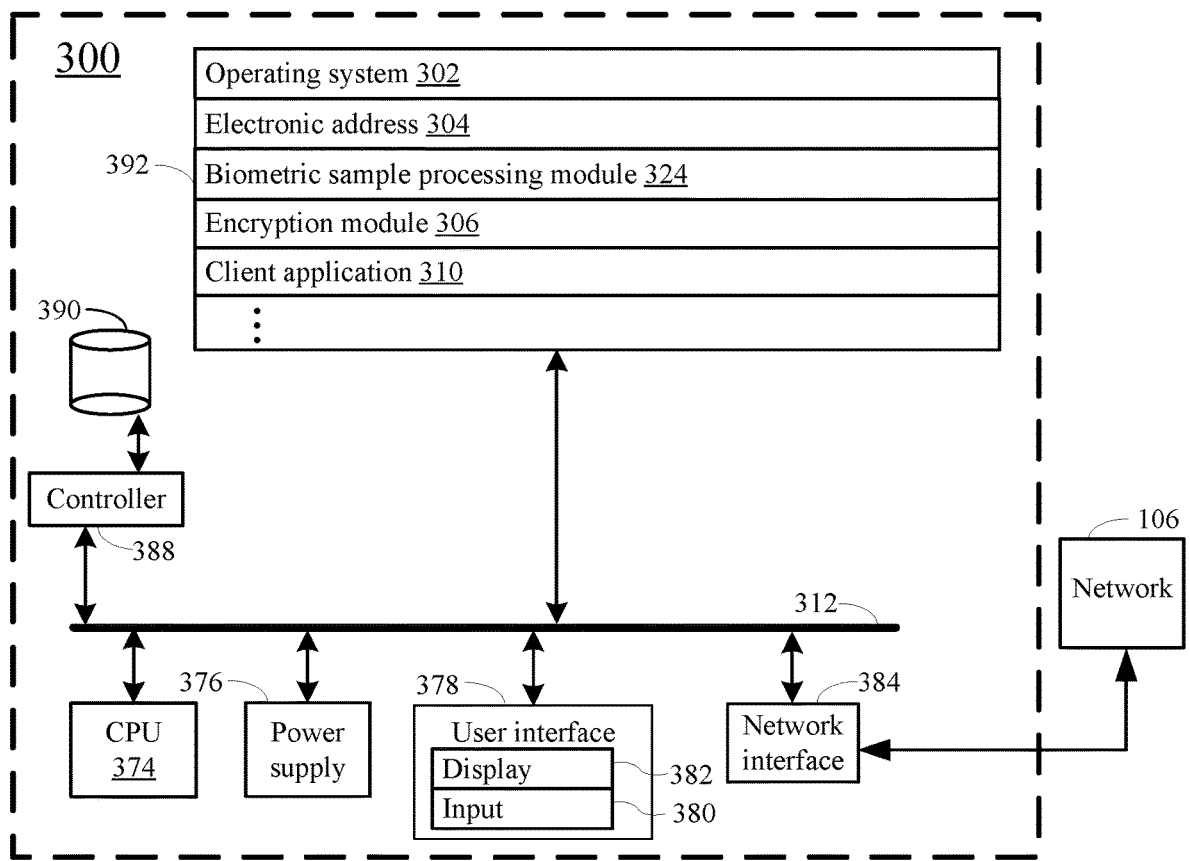
FIG. 3 illustrates various modules and/or components a client device, in accordance with an embodiment of the present disclosure.

Referring to FIG. 3, an exemplary client device 300 is provided (e.g., first client device 300-1, first device of block 402 of FIG. 4A, etc.). A client device 300 includes one or more processing units (CPUs) 372, one or more network or other communication interfaces 384, memory 392 (e.g., random access memory and/or non-volatile memory) optionally accessed by one or more controllers (e.g., controller 388), and one or more communication busses 312 interconnecting the aforementioned components.

In some embodiments, a client device 300 includes a mobile device, such as a mobile phone, a tablet, a laptop computer, a wearable device such as a smart watch, and the like. However, the present disclosure is not limited thereto. For instance, in some embodiments, the client device 300 is a desktop computer or other similar devices. Further, in some embodiments, each client device 300 enables a respective subject (e.g., registrant) to provide information related to the respective subject, such as a corresponding account information construct 18 and/or an electronic sampling of a respective biometric sampling of the respective subject.

In this way, in some embodiments, the client device 300 includes a biometric sample reader (e.g., biometric sample reader 600 of first client device 300-1 of FIG. 6). The biometric sample reader 600 is configured to capture a respective biometric sampling from a subject. Each respective biometric sampling includes a visually identifying characteristic. By way of example, in some embodiments, the biometric sample reader 600 is configured to capture electronic representations of one or more fingerprints of the subject. In some embodiments, the biometric sample reader 600 is configured to capture electronic representations of one or more facial characteristics of the subject, such as retina characteristics of the subject. However, the present disclosure is not limited thereto.

In some embodiments, the client device 300 includes a user interface 378. The user interface 378 typically includes a display device 382 for presenting media, such as a confirmation of a request for service (e.g., a service provided by a third party). In some embodiments, the display 382 is utilized for presenting instructions received from a subject operating the client device 300 (e.g., a third party). In some embodiments, the display device 382 is optionally integrated within the client device 300 (e.g., housed in the same chassis as the CPU 374 and memory 392), such as a smart (e.g., smart phone) device. In some embodiments, the client device 300 includes one or more input device(s) 380, which allow the subject to interact with the client device 300. In some embodiments, input devices 380 include a keyboard, a mouse, and/or other input mechanisms, such as a biometric sample reader 600 for capturing an electronic representation of a respective biometric sampling from a subject. Alternatively, or in addition, in some embodiments, the display device 382 includes a touch-sensitive surface, e.g., where display 382 is a touch-sensitive display or client device 300 includes a touch pad.

In some embodiments, the client device 300 includes an input/output (I/O) subsystem 330 for interfacing with one or more peripheral devices with the client device 300, such as a biometric sample reader. For instance, in some embodiments, audio is presented through an external device (e.g., speakers, headphones, etc.) that receives audio information from the client device 300 (e.g., an auditory biometric sampling) and/or a remote device (e.g., biometric authentication system 200), and, optionally, presents audio data based on this audio information. In some embodiments, the input/output (I/O) subsystem 330 also includes, or interfaces with, an audio output device, such as speakers or an audio output for connecting with speakers, earphones, or headphones. In some embodiments, the input/output (I/O) subsystem 330 also includes voice recognition capabilities (e.g., to supplement or replace an input device 810). However, the present disclosure is not limited thereto.

In some embodiments, the client device 300 further includes an image capture device (e.g., a camera device or an image capture module and related components, a two-dimensional pixelated detector, etc.), which facilitates capturing an electronic representation that is an image of a biometric sampling. By way of example, in some embodiments, the electronic representation of the biometric sampling is captured by the client device 300 utilizes a wavelet scalar quantization (WSQ) compression standard. In some embodiments, the electronic representation of the biometric sampling is captured by the client device 300 utilizes a discrete wavelet transformation (DWT) compression standard, such as a JPEG 2000 format. However, the present disclosure is not limited thereto. For instance, in alternative embodiments, the electronic representation of the biometric sampling is captured by the client device 300 utilizes a context-based adaptive wavelet different reduction (CAWDR) compression standard. Additional details and information regarding an e electronic representation of a biometric sampling can be found at Rekha et al., 2017, "Efficient Low Bit Rate Image Coder for Fingerprint Image Compression," Journal of Information Science and Engineering, 32, print; Figueroa-Villanueva et al., 2003, "A Comparative Performance Analysis of JPEG 200 vs. WSQ for Fingerprint Image Compression," International Conference on Audio-and-Video-Based Biometric Person Authentication, pg. 385, each of which is hereby incorporated by reference in its entirety.

As described above, in some embodiments, the client device 300 includes a user interface 378. The user interface 378 typically includes a display device 382, which is optionally integrated within the client device 300 (e.g., housed in the same chassis as the CPU and memory, such as with a smart phone or an all-in-one desktop computer client device 300). In some embodiments, the client device 300 includes a plurality of input device(s) 380, such as a keyboard, a mouse, and/or other input buttons (e.g., one or more sliders, one or more joysticks, one or more radio buttons, etc.). Alternatively, or in addition, in some embodiments, the display device 382 includes a touch-sensitive surface, e.g., where display 382 is a touch-sensitive display 382 or a respective client device 300 includes a touch pad.

In some embodiments, the client device 300 also includes one or more of: one or more sensors (e.g., accelerometer, magnetometer, proximity sensor, gyroscope) and/or a location module (e.g., a Global Positioning System (GPS) receiver or other navigation or geolocation device and related components). In some embodiments, the sensors include one or more hardware devices that detect spatial and motion information about the client device 300. Spatial and motion information can include information about a position of the client device 300, an orientation of the client device 300, a velocity of the client device 300, a rotation of the client device 300, an acceleration of the client device 300, or a combination thereof. In some embodiments, the sensors include one or more cameras positioned on the client device 300.

Memory 392 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 392 may optionally include one or more storage devices remotely located from the CPU(s) 374. Memory 392, or alternatively the non-volatile memory device(s) within memory 392, includes a non-transitory computer readable storage medium. Access to memory 392 by other components of the client device 300, such as the CPU(s) 374 and the I/O subsystem 330, is, optionally, controlled by a controller. In some embodiments, memory 392 can include mass storage that is remotely located with respect to the CPU 374. In other words, some data stored in memory 392 may in fact be hosted on devices that are external to the client device 300, but that can be electronically accessed by the client device 300 over an Internet, intranet, or other form of network 106 or electronic cable using communication interface 384.

In some embodiments, the memory 392 of the client device 300 stores:
an operating system 302 that includes procedures for handling various basic system services;
an electronic address 304 associated with the client device 300 that identifies the client device 300 within a distributed system 100;
a biometric sampling processing module 324 for producing an instant of a UDI 22 from an electronic representation of a respective biometric sampling captured at the client device 300;
an encryption module 306 for encrypting and/or decrypting data that is transmitted to and/or from a biometric authentication system 200;
a client application 310 for generating content for display through a graphical user interface presented on the display 382 the client device 300, such as a confirmation for a request for service provided by a user associated with the client device 300.

An electronic address 304 is associated with the client device 300, which is utilized to at least uniquely identify the client device 300 from other devices and components of the distributed system 100. In some embodiments, the electronic address 304 associated with the client device 300 is used to identify a source of an electronic representation of a biometric sampling that is captured using the client device 300.

In some embodiments, the client application 310 facilitates providing a biometric sampling process module 324. In such embodiments, the biometric sampling process 324 provided by the client application 310 is as described with respect to the biometric sampling process module 24 of FIG. 2. In this way, in such embodiments, the client device 300 produces an instance of a UDI 22 locally via the biometric sampling process module 324 and transmits the instance of the UDI 22 to a biometric authentication system 200. However, the present disclosure is not limited thereto.

In some embodiments, the biometric sampling process module 324 facilitates capturing an electronic representation of a respective biometric sampling. As a non-limiting example, in some embodiments, the biometric sampling process module 324 is in communication with a biometric sample reader 600 that is in electronic communication with the client device 300 (e.g., block 402 of FIG. 4A). However, the present disclosure is not limited thereto.

In some embodiments, the client device 300 includes an encryption module 306 that facilitates encrypting and/or decrypting a transmission through a communications network 106. For instance, in some embodiments, the encryption module 306 encrypts an electronic representation of a respective biometric sampling or an instance of a UDI 22 prior to transmitting the electronic representation of the respective biometric sampling or the instance of the UDI 22 to a biometric authentication system 200 through the communications network 106. Additional details and information regarding an encryption of a transmission can be found at Hendi et al., 2019, "A Novel Simple and Highly Secure Method for Data Encryption-Decryption," International Journal of Communication Networks and Information Security, 11(1), pg. 232; Ramya et al., 2016, "Secure Military Communication Using Ciphertext Policy Attribute Based Encryption for Decentralized DTN," International Journal of Computer Science and Network Security, 16(4), pg. 84, each of which is hereby incorporated by reference in its entirety.

In some embodiments, each client application 310 is a group of instructions that, when executed by a processor, generates content for presentation to the user. A client application 310 may generate content in response to inputs received from the user through movement of the client device 300, such as the inputs 380 of the client device 300.

In some embodiments, the client application 310 facilitates generating a request for service between a registrant (e.g., first user) and a service provided (e.g., second user, third party, etc.). For instance, in some embodiments, in accordance with a determination that the registrant is associated with more than one account information constructs 18 in a plurality of account information constructs 18, the client application 310 can present a prompt to the registrant to select a respective account information construct 18 in the more than one account information constructs 18.

Each of the above identified modules and applications correspond to a set of executable instructions for performing one or more functions described above and the methods described in the present disclosure (e.g., the computer-implemented methods and other information processing methods described herein, method 400 of FIGS. 4A and 4B, method 500 of FIG. 5, etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 392 optionally stores a subset of the modules and data structures identified above. Furthermore, in some embodiments, the memory 392 stores additional modules and data structures not described above.

It should be appreciated that the client device 300 of FIG. 3 is only one example of a client device 300, and that the client device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Now that a general topology of the distributed system 100 has been described in accordance with various embodiments of the present disclosures, details regarding some processes in accordance with FIGS. 4A and 4B will be described. FIGS. 4A and 4B collectively illustrates a flow chart of methods (e.g., method 400) for tokenless authentication (e.g., tokenless biometric authentication of a request for service), in accordance with embodiments of the present disclosure. Specifically, an exemplary method 400 for tokenless authentication of a request from a first user (e.g., a registrant) for a service (e.g., of a second user service provided) through a third party (e.g., third user) is provided, in accordance with some embodiments of the present disclosure. In the flow charts, the preferred parts of the methods are shown in solid line boxes, whereas optional variants of the methods, or optional equipment used by the methods, are shown in dashed line boxes. As such, FIGS. 4A and 4B collectively illustrate methods for tokenless authentication.

Various modules in the memory 292 of the biometric authentication system 200 (e.g., biometric authentic system 200 of FIG. 2), the memory 392 of a client device 300, or both perform certain processes of the methods 400 described in FIGS. 4A and 4B, unless expressly stated otherwise. Furthermore, it will be appreciated that the processes in Figure FIGS. 4A and 4B can be encoded in a single module or any combination of modules.

Block 402. Referring to block 402 of FIG. 4, a method 400 for tokenless authentication is provided. The method 400 includes obtaining an electronic representation of an initial biometric sampling of a registrant (e.g., first user). In some embodiments, the electronic representation of an initial biometric sampling of the registrant is obtained at a first device (e.g., client device 300 of FIG. 3, client device 300-1 of FIG. 6, etc.). In some embodiments, the first client device 300-1 includes a biometric sample reader (e.g., biometric sampling reader 600 of FIG. 6) that is in electronic communication with the first client device 300-1 and configured to capture the initial biometric sampling from the registrant. In some embodiments, the biometric sample reader 600 is configured to capture a fingerprint of the registrant.

Block 404. Referring to block 404, the method 400 further includes applying the initial electronic representation of the biometric sampling to a template data construct (e.g., template data construct 30 of FIG. 2) to produce an initial instance of a unique digital identifier (UDI) (e.g., UDI 22 of FIG. 2). By utilizing the UDI, the method 400 provides a standardize mechanism that can receive a variety of formats for the initial electronic representation of the biometric sampling. In this way, in some embodiments, a first data size of the UDI 22 is less than a second data size of the electronic representation of the respective biometric sampling, such that the UDI 22 provides a compression and/or conversion of the electronic representation of the respective biometric sampling.

In some embodiments, the applying the initial electronic representation of the biometric sampling to produce the initial instant of the UDI 22 is performed at the first client device 300 or a device in electronic communication with the first client device 300-1, such as the biometric sample reader 600. In such embodiments, each instance of the UDI 22 produced at the first client device 300 or the biometric sample reader 600 is encrypted (e.g., via encryption module 306 of FIG. 3) prior to transmitting an instance of the UDI 22 to a biometric authentication system (e.g., biometric authentication system 200 of FIG. 1). However, the present disclosure is not limited thereto. In alternative embodiments, the applying the initial electronic representation of the biometric sampling to produce the initial instant of the UDI 22 is performed at the biometric authentication system 200. In such embodiments, the electronic representation of the respective biometric sampling is encrypted at the first client device 300-1 prior to transmitting the electronic representation of the respective biometric sampling to the biometric authentication system 200. More particularly, in such embodiments, the electronic representation of the respective biometric sampling or the UDI is transmitted to a biometric repository (e.g., biometric repository 20 of FIG. 2) of the biometric authentication system 200.

In some embodiments, for each electronic representation of a respective biometric sampling, the method 400 further includes identifying a corresponding characteristic of the respective biometric sampling based on a corresponding electronic representation of the respective biometric sampling. For instance, in some embodiments, the corresponding characteristic of the respective biometric sampling includes a plurality of minutiae of the respective biometric sampling, such as a constellation of reference points of a fingerprint of a registrant. In some embodiments, the corresponding characteristic of the respective biometric sampling is a visual identifying characteristic of the respective biometric sampling, such that the visual identifying characteristic of the respective biometric sampling is observable with the naked eye. For instance, in some embodiments, the visual identifying characteristic of the respective biometric sampling includes a plurality of minutiae of the biometric sampling, such as a size and/or pattern of a retina, or one or more rigids of a finger of the registrant. In some embodiments, each respective visual identifying characteristic of the respective biometric sampling is associated with a corresponding character of the unique SIN 16. For instance, consider a first ridge at an upper end portion of a finger and a second ridge at a lower end portion of the finger of the registrant, upon obtaining an electronic representation of the finger, a first one-way hash function 28-1 produces a UDI 22 from the electronic representation of the finger that represents the first ridge and the second ridge, and a second one-way hash function 28-2 generates a unique SID 16 of AB12 from the UDI 22, with the AB characters produced from the first ridge and the characters 12 from the second ridge.

In such embodiments, the method 400 further includes translating the corresponding characteristic of the respective biometric sampling into the template data construct 30. In some embodiments, the UDI 22 includes a coordinate mapping of the corresponding characteristic. In some embodiments, the coordinate mapping of the corresponding characteristic includes one or more coordinates for each reference point in a plurality of reference points identified within the electronic representation of the biometric sampling.

Block 406. Referring to block 406, the method 400 includes storing the initial instance of the UDI 22 at a biometric repository (e.g., biometric repository 20 of FIG. 2). As described supra, in some embodiments, the file size of the UDI 22 is less than the second file size of the electronic representation of the initial biometric sampling, which increases a speed and efficiency of a verification (e.g., block 418 of FIG. 5B) of the UDI 22. Moreover, by storing the initial instance of the UDI 22 at the biometric repository 20, the initial instance of the UDI 22 provides a permanent reference to comparison against a second instance of the UDI 22.

In some embodiments, the method 400 further includes transmitting to the third party the unique SIN 16 and the UDI 22 in electronic format (e.g., via communications network 106 of FIG. 1). In some embodiments, the transmitting of the unique SIN 16 and the UDI 22 to the third party includes forming a data construct that includes a digital steganography of the unique SIN 16 and the UDI 22. In some embodiments, the steganography of the unique SIN 16 and the UDI 22 creates a data construct that hides or fractures the unique SIN 16 and the UDI 22, which prevents the unique SIN and the UDI 22 from being identified upon inspection of the data construct. In some embodiments, the forming of the digital steganography is formed by applying the unique SIN 16 and the UDI 22 through a third one-way hash function 28-3. By forming the data construct that includes the digital steganography, the unique SIN 16 and the UDI 22 are secured from security threats during this transmitting process to and/or from the biometric authentication system 200. Additional details and information regarding a digital steganography can be found at Artz, D., 2001, "Digital Steganography: Hiding Data within Data," IEEE Internet Computing, 5(3), pg. 75; Varalakshmi, R. 2020, "Digital Steganography for Preventing Cybercrime Using Artificial Intelligence Technology," Journal of Critical Reviews 7(6), pg. 749, each of which is hereby incorporated by reference in its entirety.

Block 408. Referring to block 408, the method 400 includes obtaining a first plurality of account information constructs (e.g., first account information construct 18-1 of FIG. 2) from the registrant. The first plurality of account information constructs 18-1 is associated with the registrant and uniquely corresponds to an account held by the registrant with a third party. However, the present disclosure is not limited thereto. In some embodiments, the first plurality of account information constructs 18-1 is associated with the registrant and uniquely corresponds to two or more accounts held by the registrant with a plurality of third parties. In some embodiments, the first plurality of account information constructs 18-1 includes sufficient information to approval a request for service from the registrant. In some embodiments, the third party is a second user of a second client device 300-2 or an administrator of the first client device 300-1.

In some embodiments, each instance of the UDI 22 and/or the first plurality of account information constructs 18-1 associated with the registrant is encrypted (e.g., via encryption module 306 of FIG. 3) by the first client device 300 and obtained in an encrypted format. Accordingly, in accordance with a determination that each instance of the UDI 22 and/or the first plurality of account information constructs 18-1 is encrypted, for the obtaining thereof (e.g., block 402 of FIG. 4A, block 408 of FIG. 4A), the method 400 further includes decrypting the UDI 22 and/or the first plurality of account information constructs 18-1 associated with the registrant. This allows for transmitting each instance of the UDI 22 and/or the first plurality of account information constructs 18-1 is secure from unauthorized access when communicated over a communications network 106.

Block 410. Referring to block 410, the method 400 includes generating a unique SIN (e.g., SIN 16 of FIG. 2). This unique SIN 16 is in electronic format and is a distinct data construct. Specifically, the unique SIN is generated through a second one-way hash function (e.g., second one-way hash function 28-2 of FIG. 2). This second one-way hash function 28-2 uses at least the instance of the UDI 22 to generate the unique SIN 16. In some embodiments, the second one-way hash function 28-2 uses both the instance of the UDI 22 and the first plurality of account information constructs 18-1 to produce generate the unique SIN 16. As a non-limiting example, consider a template data construct 30 that applies an electronic representation of a respective biometric sampling through a first one-way hash function 28-1 to produce a first UDI 22-1 that includes a mapping of 25 characteristics (e.g., visually identifying minutiae) of the respective biometric sampling. In some embodiments, the second one-way hash function 28-2 includes assigning a respective alphanumeric character to the corresponding characteristic. Accordingly, the first one-way hash function 28-1 assigns each characteristic in the 25 characteristics of the respective biometric sampling a corresponding alphanumeric character. Collectively, an ordered sequence formed from each corresponding alphanumeric character is the unique SIN 16. However, the present disclosure is not limited thereto.

In some embodiments, the biometric repository 20 is configured to generate the unique SIN 16 and/or reconstruct the unique SIN 16 from an instance of a respective UDI 22. In such embodiments, the biometric repository 20 receives the electronic representation of a biometric sampling and applies the electronic representation of the biometric sampling to a biometric sampling processing module (e.g., biometric sampling processing module 24 of FIG. 2). In alternative embodiments, the first client device 300 or the biometric sample reader 600 in electronic communication with the first client device 300 is configured to generate the unique SIN 16, which is then transmitting to the biometric repository 20.

In some embodiments, the biometric repository 20 utilizes a random number generator to generate the unique SIN 16. In such embodiments, the random number generator is a quantum random number generator. Additional details and information regarding a quantum random number generator can be found at Ma et al., 2016, "Quantum Random Number Generator," npj Quantum Information," 2(1), pg. 1. For instance, in some embodiments, the quantum random number generator lock 412.

Block 412. Referring to block 412, the method 400 includes storing a unique link from the UDI 22 to the first plurality of account information constructs 18-1. In some embodiments, this unique link is stored in an indexed data structure (e.g., index data structure 14 of FIG. 2). In such embodiments, this indexed data structure 14 is different than the biometric repository 20. For instance, in some embodiments, the indexed data structure 14 is stored, at least in part, in an account repository (e.g., account repository 12 of FIG. 2) that is remote from the biometric repository 20. In some embodiments, the account repository 12 stores the unique SIN 16. In such embodiments, the account repository 12 includes both the unique SIN 16 and the first plurality of account information constructs 18-1 of the registrant. Accordingly, by including both the account repository 12 that includes both the unique SIN 16 and the first plurality of account information constructs 18-1 of the registrant with the biometric repository 20, the method 400 is capable of retrieving either the unique SIN 16 or the first plurality of account information constructs 18-1 with knowledge of the other of the unique SIN 16 or the first plurality of account information constructs 18-1 through the unique link. Moreover, the unique link prevents compromising either the unique SIN 16 or the first plurality of account information constructs 18-1 should the security of the unique SIN 16 or the first plurality of account information constructs 18-1 weaken.

Block 414. Referring to block 414, the method 400 includes receiving a request from the registrant for a service to be performed and an electronic representation of a second biometric sampling of the registrant. In some embodiments, the service is provided by the third party that the registrant holds an account with. In alternative embodiments, the service is provided by a system administrator of the first client device, such as a service provider, which is different than the third party that the registrant holds an account with. In some embodiments, the service includes a transaction, such as a request to purchase a good. In some embodiments, the service includes a request for authorization and/or access (e.g., method 1000 of FIG. 10), such as authorization to operate a vehicle.

In some embodiments, the request from the registrant for the service to be performed and the electronic representation of the second biometric sampling of the registrant are received simultaneously, such as a single encrypted packet that includes both the request from the registrant for the service to be performed and the electronic representation of a second biometric sampling of the registrant. However, the present disclosure is not limited thereto.

Block 416. Referring to block 416, the method 400 includes forming a second instance of the UDI 22 by applying the electronic representation of the second biometric sampling of the registrant to the template data construct 30 through the first one-way hash function 28-1. Here, the second biometric sampling of the registrant is obtained from a substantially identical feature of the registrant when obtaining the initial biometric sampling of the registrant (e.g., block 402 of FIG. 4A). As a non-limiting example, consider obtaining a first electronic representation of an initial biometric sampling of a registrant that includes an index finger of the registrant and then obtaining a second electronic representation of a second biometric metric sampling of the registrant that includes the index finger of the registrant. In this way, when the registrant provides a substantially identical feature of the registrant as a biometric sampling (e.g., the registrant did not sustain material modifications to the feature, such as permanent scarring between the obtaining of the initial biometric sampling and the second biometric sampling), a respective instance of the UDI 22 that is produced from the biometric sampling will be identical.

Block 418. Referring to block 418 of FIG. 4B, in this way, the method 400 includes using the biometric repository 20 to verify that the second instance of the UDI 22 corresponds to the first instance of the UDI 22. In some embodiments, this verification is absolute since that the second instance of the UDI 22 must be identical to the first instance of the UDI 22. In some embodiments, the verification of the second instance of the UDI 22 includes satisfying a threshold score level associated with a comparison of the initial instance of the UDI 22 stored at the biometric repository 20. Accordingly, by verifying that the second instance of the UDI 22 corresponds to the first instance of the UDI 22, the method 400 ensures that the same subject (e.g., the registrant) provided both the initial biometric sampling and the second biometric sampling before proceeding with the method.

Block 420. Referring to block 420, upon verification that the second instance of the UDI 22 corresponds to the first instance of the UDI 22, the method 400 includes reconstructing the unique SIN 16 from the second instance of the UDI 22. In some embodiments, the reconstructing of the unique SIN 16 is conducted by applying the second instance of the UDI 22 through the second one-way hash function 28-2. In this way, by utilizing the second one-way hash function 28-2 to not only generate the unique SIN 16 but also reconstruct the unique SID 16 from the electronic representation of the second biometric sampling allows for the method 400 to produce the unique SID 16 based on a respective biometric sampling from the registrant after generating the unique SID 16 from the initial biometric sampling (e.g., block 410 of FIG. 4B). From this, the method 400 includes using the reconstruction of the unique SIN 16 to retrieve the first plurality of account information constructs 18-1 obtained from the registrant (e.g., block 408 of FIG. 4A). In some embodiments, the retrieving utilizes the indexed data structure 14.

In some embodiments, the method 400 further includes, in response to the retrieving the first plurality of account information 18, further retrieving the unique SIN 16 based on the retrieved first plurality of account information constructs 18. In this way, the unique SIN 16 is retrieved after producing the second instance of the UDI 22, which increases security of the biometric authentication system 200.

Block 422. Referring to block 422, the method 400 includes transmitting (e.g., via communications network 106 of FIG. 1) the request for service and the reconstructed unique SIN 16 to the third party, such as a second client device 300-2 associated with the third party. In some embodiments, the transmitting the request for service and the reconstructed unique SIN 16 includes encrypting the request for the service and/or the reconstructed unique SIN 16 at the biometric authentication system 200 prior to transmitting to the third party (e.g., via encryption module 306 of FIG. 3).

Block 424. Referring to block 424, in some embodiments, the method 400 includes approving the request for the service when the reconstructed unique SIN matches the third party records for the first plurality of account information constructs for the registrant and denying the request for the service when the unique SIN fails to match the third party records of the first plurality of account information constructs for the registrant. In some embodiments, the approving or the denying of the request for the service As a non-limiting example, consider a registrant (e.g., a first user of a first client device 300-1 of FIG. 3) registers with a biometric authentication system (e.g., biometric authentication system 200 of FIG. 1). The registrant registers with the biometric authentication system 200 by providing a plurality of account information constructs (e.g., first account information construction 18-1 of FIG. 2). Additionally, the registrant provides biometric data, such as fingerprint data, such that an electronic representation of an initial biometric sampling of the registrant is obtained at the client device 300. In some embodiments, the electronic representation of the initial biometric sampling of one or more fingerprints of the registrant is provided using a biometric sample reader 600 in electronic communication with the client device 300.

In some embodiments, the first plurality of account information constructs 18 is provided, which facilitates transaction utilization methods such as: swipe (e.g., magnetic stripes), near field communication (NFC), chip mechanisms, personalized identification number (PIN). In some embodiments, the registrant provides the plurality of account information construct 18 through an input 380 of the client device 300 (e.g., keyboard). For example, in some embodiments, the client device 300 includes a biometric sample reader 600 that is a modular (e.g., plug-and-play) unit utilized by the registrant to register one or more credit card and/or one or more debit cards associated with a third party with the biometric authentication system 200. In this way, in such embodiments, the registrant can provide the plurality of account information constructs 18 in a secure and privacy location, such as the home of the registrant. Accordingly, in some embodiments, the biometric sample reader 600 includes an operating system (e.g., operating system 302 of FIG. 3, operating system 202 of FIG. 2, etc.) and a biometric capture mechanism, such as a finger print which allows the registrant to provide a biometric sampling, and, therefore, allow obtaining of an electronic representation of the biometric sampling, and the plurality of account information constructs 18 into the biometric authentication system 200.

As such, in some embodiments, the biometric sample reader 600 facilitates communicating a request from the registrant for a service (e.g., block 414 of FIG. 4A), such as on-line payments for a purchase of a good over a communication network 106. In some embodiments, the biometric sample reader 600 includes a key fob or thumb drive (e.g., universal serial bus connection). In this way, the registrant carries the biometric sample reader 600 on their person, which provides an ability to communicate the requests for the service through the communications network 106 to the biometric authentication system 200 by way of the biometric sample reader 600 of the client device 300, instead of using a physical credit card.

In some embodiments, the electronic representation of the initial biometric sampling is sent from the biometric sample reader 600 of the client device 300 to a biometric repository (e.g., biometric repository 20 of FIG. 2, block 406 of FIG. 4A). In some embodiments, this receiving of the electronic representation of the initial biometric sampling at the biometric authentication system 200 uses encryption techniques known to one of skill in the art. Accordingly, the plurality of account information constructs 18 is sent from the client device 300 to an account repository 12 that is separate from the biometric repository 20. In some embodiments, the account repository 12 is remote from the biometric repository 20. However, the present disclosure is not limited thereto.

In some embodiments, the electronic representation of the initial biometric sampling includes captures of more than one fingers of the registrant. For example, in such embodiments, the electronic representation of the initial biometric sampling includes information from different fingers of the registrant, such as two different fingers, three, different fingers, etc. In this way, in some embodiments, the electronic sampling of the biometric sampling includes capturing an ordered sequence of two or more fingers of the registrant, such as a first capture of a right hand index finger and a second capture of a left hand middle finger, which collectively form the electronic capture of the biometric sampling. In some embodiments, each respective finger of the more than one fingers is associated with a corresponding function, such as a corresponding account information construct 18 in the first plurality of account information constructs 18. For instance, in some embodiments, each finger of the registrant is applied to the template data construct 30 in order to produce a corresponding UDI 22. In this say, in some embodiments, each finger of the registrant is associated with a unique SIN 16, which allows for the registrant to select a respective account or the like based on which finger or pattern (sequence) of fingers are captured at a biometric sample reader 600. In such embodiments, the corresponding function is defined by the either the registrant or the third party, such as the registrant selecting a particular account held with the third party as the corresponding function. In some embodiments, the corresponding function is an emergency alarm function, such that when an electronic representation of a respective finger that is associated with the emergency alarm function is obtained by the biometric system 200 or captured by the biometric sample reader 600 at the client device 300, an alarm is forward to a remote device, such as a fourth client device 300-4 associated with a law enforcement entity. However, the present disclosure is not limited thereto.

In some embodiments, a corresponding function associated with the electronic representation of the initial biometric sampling is a retrieval function of an account information construction 18 in the plurality of account information constructs 18 of the account repository (e.g., block 420 of FIG. 4B).

Accordingly, the electronic representation of the initial biometric sampling of one or more fingers of the registrant is obtained by the biometric authentication system 200 (e.g., block 402 of FIG. 4A, block 414 of FIG. 4A). From this, the biometric authentication system 200 produces a UDI (e.g., UDI 22 of FIG. 2, block 404 of FIG. 4A) by applying the electronic representation of the initial biometric sampling to a template data construct (e.g., template data construct 30 of FIG. 2) through a first one-way hash function (e.g., first one-way hash function 28-1 of FIG. 2). By producing the UDI 22, the biometric authentication system 200 not only preserves accuracy of the initial biometric sampling, but also reduces data size in comparison to storing an image file of the biometric sampling. By way of example, in some embodiments, a plurality of visual identifying characteristics is identified from a fingerprint of the registrant, and the plurality of visual identifying characteristics is extracted by a biometric sampling processing module (e.g., biometric sampling processing module 24 or FIG. 2, client application 310 of FIG. 3). From this, the plurality of visual identifying characteristics is captured by the biometric sample reader 600 of the client device are applied to a template data construct. Accordingly, the template data construct 30 is created by the biometric authentication system 200 in order to map the minutiae and patterns (e.g., in relation to a center of a fingerprint of the registrant) of the biometric sampling to produce the UDI 22. Accordingly, the UDI 22 provides a resulting map that includes a set of coordinates. From this, in some embodiments, the set of coordinates is then produced for when the registrant provides the same fingerprint), such that the biometric authentication system 200 searches the set of coordinates of the UDI using matching classification mechanisms and the indexed data structure 14.

Figure 7:
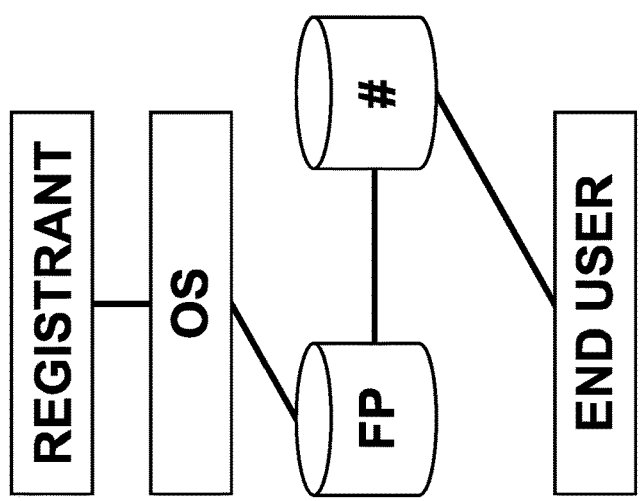
FIG. 7 illustrates yet another flow chart of methods for tokenless authentication, in accordance with an embodiment of the present disclosure.

Referring to briefly to FIG. 7, each registrant is generated (e.g., block 410 of FIG. 4A) a unique SID 16. This unique SID 16 is then associated (linked) with both the UDI 22 and with the plurality of account information constructs 18. Accordingly, the unique SID 16 is transmitted to a remote device (e.g., second client device 300-2) associated with a third party to which the registrant holds an account with. Accordingly, this transmitting allows the third party to associate the unique SID 16 with the account held by the registrant with the third party. In this way, the electronic representation of the initial biometric sampling, the UDI 22, and the plurality of account information construct 18 are not stored in the client device 300 used to obtain an electronic representation of an initial biometric sampling of a registrant (e.g., block 402 of FIG. 4A, block 408 of FIG. 4A), which eliminates the possibility of identity theft due to hacking or losing access to the client device 300.

Referring to briefly to FIG. 6, in some embodiments, the client device 300 utilized by the registrant includes a point of service (POS) mechanism. The POS mechanism includes a card utilization mechanism, such as a magnetic swipe mechanism, RF near field mechanism, a chip mechanism, and a PIN mechanism, an NFC mechanism, or a combination thereof, and a biometric sample reader 600 for obtaining an electronic representation of a respective biometric sampling, such as a fingerprint reader or a retina reader. In some embodiments, the client device 300 includes an operating system 302 that is resident in the biometric sample reader 600 that includes encryption modules to transmit an electronic representation of a respective biometric sampling captured by the biometric metric sample reader 600 when facilitating a request for service (e.g., block 416 of FIG. 4A).

In some embodiments, a registrant engages the client device 300 via a biometric sample reader 600 to engage in a two-step registration process. As part of the two-step registration process, an electronic representation of an initial biometric sampling (e.g., image of a fingerprint) is obtained using the client device 300. In some embodiments, the electronic representation of an initial biometric sampling is encrypted by an encryption module (e.g., encryption module 306 of FIG. 3) at the client device 300 and then transmitter to a biometric repository (e.g., biometric repository 20 of FIG. 2). In some embodiments, this encryption includes utilizing a biometric sampling process module (e.g., biometric sampling process module 24 of FIG. 2) that provides an electronic representation of the initial respective biometric sampling for encryption. In such embodiments, the initial respective biometric sampling is then received at the biometric authentication system 200 and decrypted for verification as accurate according to standards known to one of skill the art. Accordingly, with the initial respective biometric sampling decrypted and verified then, the registrant enters a plurality of account information constructs 18 at the client device 300. In some embodiments, the plurality of account information constructions 18 include card and personal data that uniquely corresponds with an account of the registrant with the third party. In some embodiments, the plurality of account information constructions 18 is provided by the registrant through the biometric sample reader. The plurality of account information constructs 18 is encrypted by the encryption module 306 and transmitted to an account repository (e.g., account repository 12 of FIG. 2). From this, the biometric authentication system 200 generates a unique SIN (e.g., second SID 16-2 of FIG. 2) through a one-way hash function (e.g., second hash function 28-2 of FIG. 2, block 410 of FIG. 4A). In alternative embodiments, the unique SIN 16 is generated at the client device (e.g., via biometric sampling process module 324 of FIG. 3). The unique SIN 16 is assigned by an index data structure to link the plurality of account information constructs 18 to the initial respective biometric sampling of the registrant and/or the UDI 22 of the registrant. Moreover, the unique SIN 16 is stored at the account repository 12. In some embodiments, the linking of the unique SIN 16 to both the UDI 22 and the plurality is performed, for example, by transmitting a UDI (e.g., UDI 22 of FIG. 2) that is produced from the electronic representation of the initial biometric sampling to the account repository 12 along with the plurality of account information constructs 18 (card holder account information), which then assigns the unique SIN 16 to the plurality of account information constructs 18 provided by the registrant and links the unique SIN 16 with the UDI 22 that is produced from the electronic representation of the of the initial biometric sampling. The actual linking of the unique SIN 16 with the plurality of account information constructs 18 and the electronic representation of the initial biometric sample and/or the UDI 22 can be performed in a variety of ways. For example, in some embodiments, the UDI 22 that is produced from the electronic representation of the initial biometric sample is mapped to one or more accounts held by the registrant, which are themselves mapped to one or more unique SINs 16. The unique SIN 16 is transmitter (e.g., block 422 of FIG. 4B) to the third party that issued the account with the registrant to link the unique SIN 16 to the plurality of account information constructs 18 provided by the registrant.

Figure 8:
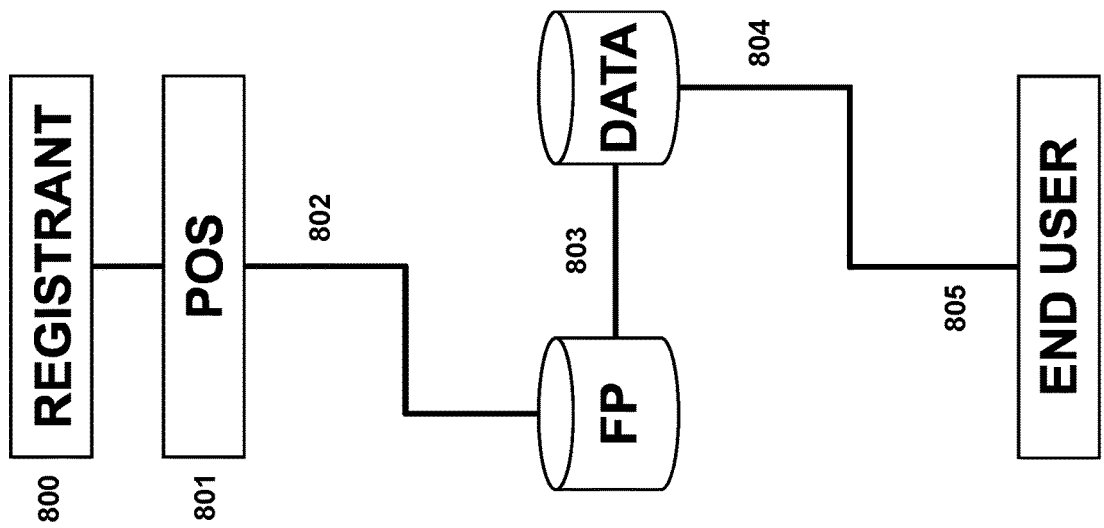
FIG. 8 illustrates a flow chart of methods for tokenless authentication at a client device, in accordance with an embodiment of the present disclosure.

Referring briefly to FIG. 8, an example of utilizing the systems (e.g., system 100 of FIG. 1) and methods (e.g., method 400 of FIGS. 4A and 4B, method 500 of FIG. 5) with a client device 300 located in a physical retail location to facilitate a request for a transaction is provided. A registrant engages a biometric sample reader (e.g., biometric sample reader 600 of FIG. 6) of the client device 300 (800). The biometric sample reader is configured to obtain a respective biometric sampling of the registrant that includes one or more fingerprints of the registrant (801). The electronic representation of the biometric sampling is encrypted (e.g., via encryption module 306 of FIG. 3) and communicated to a biometric repository (e.g., biometric repository 20 of FIG. 2) (802). The electronic representation of the biometric sampling is decrypted and matched to an electronic representation of an initial biometric sampling obtained from the registrant (e.g., block 402 of FIG. 4A, block 418 of FIG. 4B). If the match is deemed correct, then the electronic representation of the biometric sampling is transmitter to the account repository 12. If the match is deemed incorrect, in some embodiments, the registrant is presented through a display 382 of the client device 300 with a prompt to capture an alternate biometric sampling at the biometric sample reader. In some embodiments, the registrant is prompted to use another method to facilitate the request for the transaction. If the electronic representation of the biometric sampling is deemed a corrected match, then the electronic representation of the biometric sampling is matched to the plurality of account information constructs 18 in the account repository 12. For example, in some embodiments, a UDI 22 is produced from the electronic representation of the biometric sampling by applying the electronic representation of the biometric sampling to a template data construct 30 through a one-way hash function (e.g., first one-way hash function 28-1 of FIG. 2) used during registration (e.g., block 402 of FIG. 4A) to link the plurality of account information constructs 18 and the electronic representation of the biometric sampling and assign a unique SIN 16, and this UDI 22 can be used to determine if there are any matching account data records for that UDI 22. If more than one account is registered to that biometric sample, the registrant is prompted to choose the type of card (803). If there is a match between the fingerprint data and the plurality of account information constructs 18, transaction data and the secure identification number corresponding to the plurality of account information constructs 18 (or corresponding to selected account data when there are more than one matching account data records) are sent from the account repository 12 to the card issuer (804). The card issuer matches the secure identification number to the registrant's account and approves/rejects transaction (805).

Figure 9:
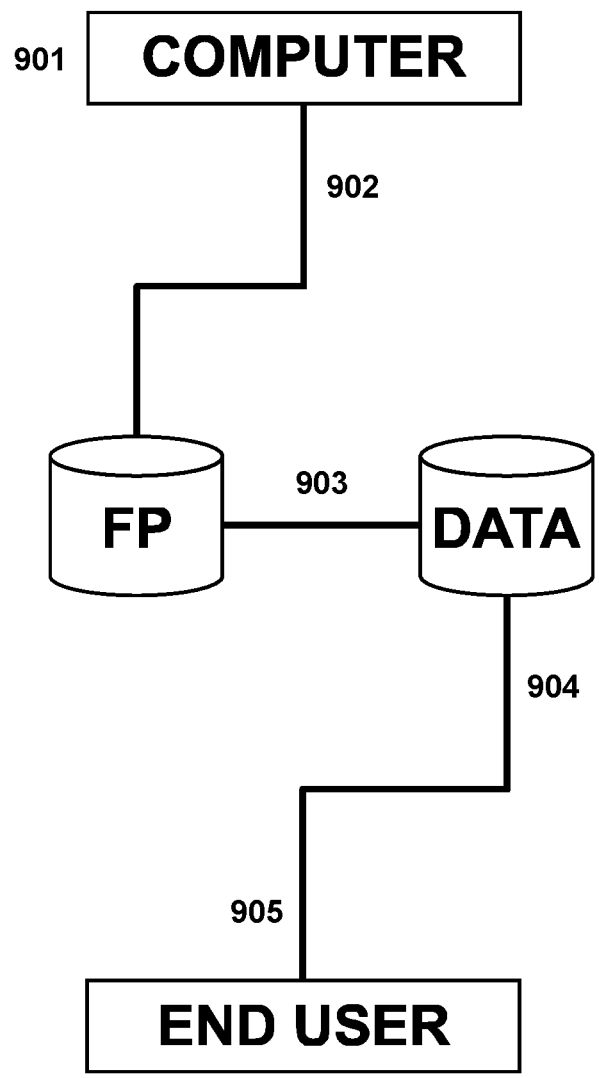
FIG. 9 illustrates another flow chart of methods for tokenless authentication at a client device, in accordance with an embodiment of the present disclosure.

Referring to briefly to FIG. 9, for a remote computer or PC purchase, 1) a registrant engages a fingerprint reader on a modular unit containing the operating system and encryption software (the fingerprint reader may also be on the keyboard). 2) The registrant makes a purchase on a website, goes to cart on website to pay, clicks pay and activates fingerprint reader on the modular unit to make a payment. In some embodiments, steps (903) through (905) are as steps (803) through (805) of FIG. 8 are described. However, the present disclosure is not limited thereto.

By way of example, in some embodiments, the systems (e.g., system 100 of FIG. 1) and methods (e.g., method 400 of FIGS. 4A and 4B, method 500 of FIG. 5) of the present disclosure are used within a non-commercial multi-platform closed-system, such as an educational entity environment, in order to securely control and authenticate all requests for services within the non-commercial multi-platform closed-system.

In some embodiments, the systems and methods of the present disclosure provide a tokenless out-of-band individual identity confirmation and security, whereby individual subjects register their identity with an out-of-band biometric repository (e.g., biometric repository 20 of FIG. 2) by registering one or more biometric samplings, which an initial instance of a UDI 22 is produced from (e.g., block 404 of FIG. 4).

In some embodiments, out-of-system verification of an authorized registrant is confirmed by non-biometric sampling provided by the authorized registrant to an end-user, such as third party of an administrator of the biometric authentication system 200.

In some embodiments, the biometric repository 20 does not includes PII, which allows for the biometric repository 20 to have anti-fraudulent capabilities.

In some embodiments, during registration (e.g., block 402 of FIG. 4A, block 408 of FIG. 4A), the registrant registers within the biometric authentication system 200 utilizing a client device 300. Here, the client device 300 includes a biometric sample reader (e.g., biometric sample reader 600 of FIG. 6) that is in electronic communication with the client device. In this way, the biometric sample reader 600 allows the registrant to submit multiple biometric samplings (e.g., an initial biometric sampling, a second biometric sampling, etc.) using the biometric sample reader that is in communication with tied directly to a repository system including two separate, out-of-band secure repositories. The systems and methods of the present disclosure are capable of capturing and analyzing biometric samples individually and in multiples including one specific identified biometric sampling to be utilized solely for critical or special purposes (e.g., functions, such as emergency alarm functions). Each biometric sampling is captured at the client device 300, e.g., via the biometric sample reader 600 and are also translated into template storage format using encryption to ensure secure transmission capability to the repository.

In such embodiments, the encrypted UDI 22 or the electronic representation of the biometric sampling is sent to the biometric repository 20 of the biometric authentication system 200. In some embodiments, the biometric repository 20 then decrypts the instance of the UDI 22 or the electronic representation of the biometric sampling.

During the registration step, account information is also entered or captured utilizing the registration unit which encrypts the plurality of account information constructs 18 and sends it to the biometric repository 20. The biometric repository 20 then decrypts the submitted account information data.

Upon completion of the registration of multiple biometric samples, the biometric repository 20 generates a digital secure identification number (SIN) utilizing quantum random number generation. This unique SIN 16 is linked to the biometric repository 20 biometric samples and utilized internally, only, to compare and validate the biometric sample to the registered account of the end-user. During registration, this SIN is provided by the system to the identified card/account issuer for linking to the identified account.

In some embodiments, the unique SIN 16 and the decrypted first plurality of account information constructs 18-1 are sent to an account repository (e.g., account repository 12 of FIG. 2) from the biometric repository 20, wherein the unique SIN 16 is stored in the account repository 12.

In some embodiments, the unique SIN 16 and the decrypted first plurality of account information constructs 18-1 are also sent to an end user from the account repository 12 so that the end user can link the unique SIN 16 and the plurality of account information constructs 18.

In some embodiments, when facilitating a request for service, such as a transaction, the only account data in the first plurality of account information constructs 18-1 that is transmitted to a third party (e.g., second client device 300-2) is the unique SIN 16 and transaction data information (TDI), which allows the third party to recall the account held by the registrant based on the unique SIN 16. In this way, a registrant entrance into and use of the systems and methods of the present disclosure requires only a biometric sampling from the registrant without use of a token.

Specifically, during the facilitating of the request for service, at least one biometric sampling of the registrant is captured by a second biometric sample reader 600-2 associated with a client device 300, such as a transaction unit, to capture an electronic representation of a second biometric sampling. The electronic representation of the second biometric sampling is encrypted and electronically transmitted from the client device 300 to the biometric repository 20, in which the biometric repository 20 decrypts the electronic representation of the second biometric sampling.

In some embodiments, the biometric repository 20 compares the decrypted electronic representation of the second biometric sampling to the decrypted electronic representation of the initial biometric sampling and verifying whether there is a match between the electronic representation of the second biometric sampling and the electronic representation of the initial biometric sampling. In some embodiments, the transaction data information is encrypted and sent from the client device 300 to the biometric repository 20. If a match between the electronic representation of the second biometric sampling and the electronic representation of the initial biometric sampling data is verified, the transaction data information is electronically sent to the account repository 12 from the biometric repository 20. After comparison of the unique SIN 16, the transaction data information and the unique SIN 16 linked to the electronic representation of the initial biometric sampling are electronically sent to the third party from the account repository 12.

In some embodiments, the third party then determines approval or disapproval of the transaction for the transaction data information sent from the account repository 12 and the registrant's account linked to the secure identification number sent from the account repository 12 (e.g., block 424 of FIG. 4B) and sends the approval or disapproval to the client device 300 through the biometric repository 20. Specifically, in some embodiments, after confirmation of biometric sample and comparison of the unique SIN 16, the account repository 12 translates the unique and individual transaction into a reporting system unique to the third party requiring verification and identification.

In some embodiments, the account repository 12, if a financial transaction is applicable as the request for service, the systems and methods of the present disclosure generate, via the client device 300, a TDI that will be sent by the account repository 12 directly to the third party. In some embodiments, the third party is a payor of the request for service. In some embodiments, the third party is a reporting entity associated with the request for service, such as an accounting reporting entity, a payment reporting entity, or other financial tracking reporting entity.

In some embodiments, the systems and methods of the present disclosure is utilized for any purpose of the third party and the registrant necessary or required to ensure and confirm individual identity to include secure entrance to facilities, programs or other controlled access operations; secure transactions, financial and non-financial, where asset tracking is required or where financial related transactions are initiated; operations and events that require secure and confirmed individual identification as a requirement for participation; utilization of individual control to eliminate asset or financial fraud.

In some embodiments, the biometric repository 20 operates such that individual identity is confirmed via out-of-band analysis and is agnostic to type of third party by utilization of assigned quantum generated random SIN matching to biometric sample. In some embodiments, the unique SIN 16 is unknown to or used by individual assigned that unique SIN 16 and eliminates the need for any token or any other apparatus to compare or further identify the individual.

In some embodiments, once confirmed, the account repository 12 then processes the identified transaction, whether it is simple verification of identity, a necessary financial transaction between participant and a third party, or some other form of third party-registrant individual confirmation transaction.

In some embodiments, the biometric repository 20 and the account repository 12 is capable to be utilized in a remote capacity, individual from a static system of readers, point-of-sales units or facilities or other static-based operations, and is operated without need for or reliance on any apparatus or token. For example, in some embodiments, the systems and methods of the present disclosure is read with remote biometric sample readers 600 for registrant and/or end user events, such as, student attendance, sponsored activities, document and asset control, etc. as well as for use with roving POS for retail financial transactions for restaurants, etc.

In some embodiments, the systems and methods of the present disclosure includes, within the comparison process, a system of digital challenges and a layer of predictive analytics triggered dependent on biometric usage, purpose of usage and random. The digital challenges are secondary verifications initiated by the biometric repository 20 and sent to the transaction unit. The digital challenge may be, for example, a request to recapture biometrics data if the captured biometrics data is not readable. For example, the registrant may be asked to use a different finger to capture a fingerprint. Digital challenges, such as predetermined questions, may also be issued randomly as an additional security process.

Figure 10:
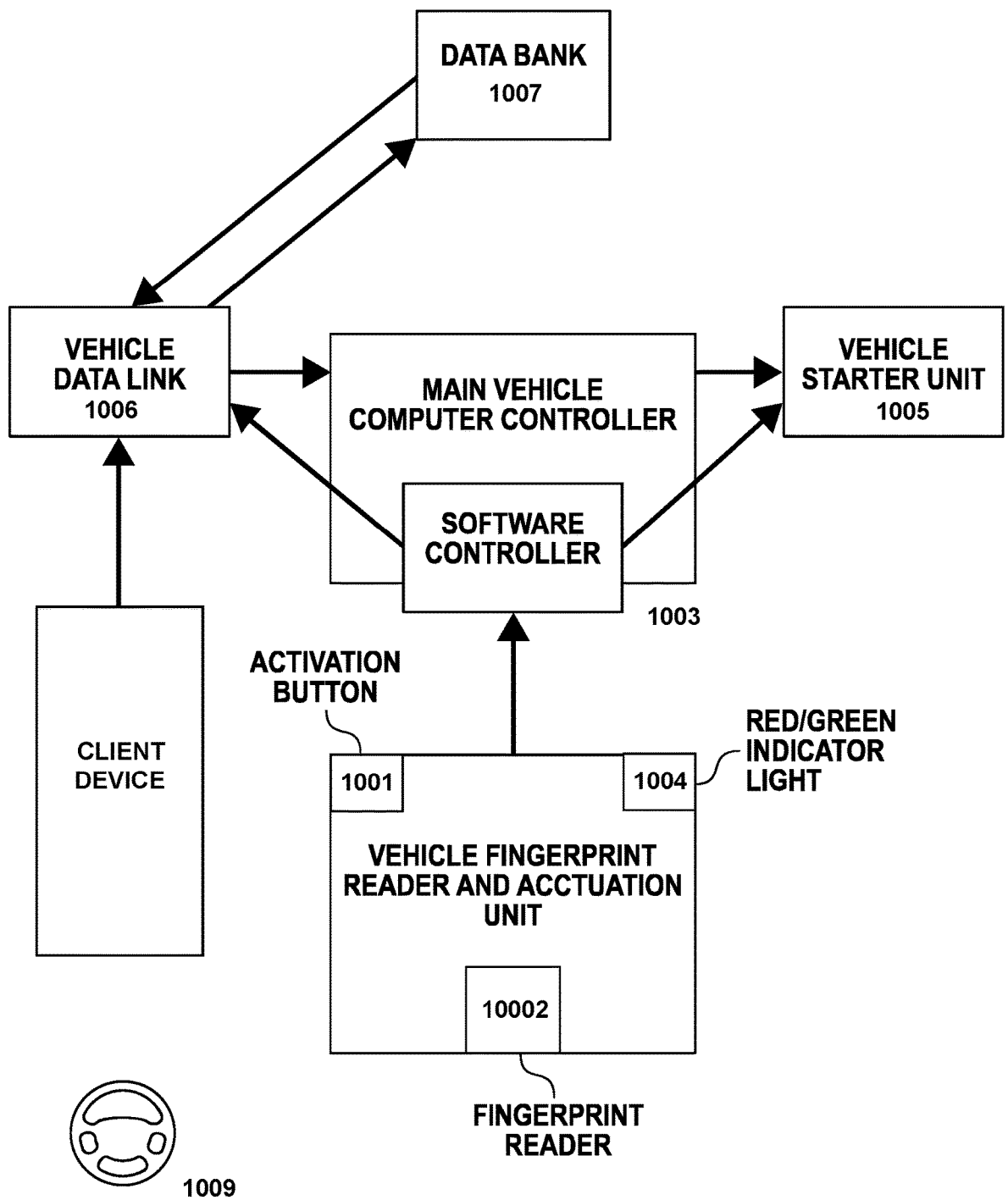
FIG. 10 illustrates a flow chart of methods for tokenless authentication at a vehicle, in accordance with an embodiment of the present disclosure.

As shown in FIG. 10, in some embodiments, the systems and methods of the present disclosure are used for request for service of a secure vehicle ignition control. In such embodiments, the systems and methods include a push button that activates a biometric sample reader 600 (e.g., fingerprint reader) that allows for capture of an electronic representation of a biometric sampling, recognition of the electronic representation of a biometric sampling (e.g., block 414 of FIG. 4A), and activation of a vehicle starter. In some embodiments, once the biometric sample reader 600 is activated, a registered vehicle operator (registrant) places an appendage, such as a finger, on the biometric sample reader 600. The biometric sample reader 600 captures an electronic representation of the registrant's fingerprint. In some embodiments, the electronic representation is encrypted and sent to the internal computer processing unit, which is embedded in a main computer system of the vehicle. The biometric sample reader 600 additionally serves as a mechanism for the registrant to register their fingerprint with the main computer system and an external data bank (e.g., biometric authentication system 200 of FIG. 2). In such embodiments, the registrant can choose whether to operate the vehicle as "Fingerprint only" or as "Fingerprint or Key." The main computer system decrypts and matches the electronic representation of the biometric sampling against all vehicle registered electronic representation of the biometric samplings, which is either accepted or rejected. In some embodiments, once the main computer system receives, decrypts, matches and authorizes the electronic representation of the biometric sampling of the registrant, a light visually activates indicating acceptance on the biometric sample reader 600. If an error occurs in the process, a different light will be activated indicating and error and need to restart the process or use a vehicle key. If the main computer system accepts the fingerprint, an electronic signal is sent to the vehicle starter unit to start the vehicle's engine. If the main computer system accepts the fingerprint, it is sent, via the vehicle's on-board wireless data link to the biometric authentication system 200 and is registered as "in operation." As a security protective method, the vehicle owner can utilize the system's computer data bank center to send a signal to the vehicle to "kill the engine", and as record of vehicle usage. Use of a client device 300 as an adjunct for vehicle operation. In some embodiments, a registrant can register the electronic representation of the biometric sampling via the biometric sample reader 600. Utilizing the cellular telephone or a computer to access the system's Internet website connected to the system's external software data base center, the owner/operator will: activate the biometric sample reader 600, placing the fingerprint on the biometric sample reader. The biometric sample reader 600 encrypts the fingerprint and sends it to the biometric authentication system 200. The fingerprint is received, decrypted, matched and authorized (or rejected). In some embodiments, if the fingerprint is accepted, the third party sends a wireless signal via communications network 106 to a registered vehicle internal data link. The data link will send the signal to the vehicle's internal system's CPU. The main computer system will send the signal to the vehicle's starter unit the vehicle will start. In some embodiments, if the Fingerprint is accepted by the biometric authentication system, the third party can send a wireless signal the registered vehicle internal data link. The data link will send a signal to the main computer system. The main computer system will send a signal to the vehicle's starter unit. The vehicle will shut off. In some embodiments, the vehicle steering wheel surface includes an electro-sensitive strip of conductive materials which will record and transmit the registrant's fingerprint(s) via the steps stated above.

The systems and methods of the present disclosure have several advantages. In some embodiments, no card is ever needed, which means no replacements, no inconvenience, no need to ever change account number. In some embodiments, the systems and methods of the present disclosure use fingerprint biometric samplings as conclusive ID and authentication. Moreover, in some embodiments, the systems and methods of the present disclosure is used for multi-applications and multi-platforms, or for financial transactions. In some embodiments, the systems and methods of the present disclosure utilizes multi-modal out-of-band security mechanisms.

Referring to FIG. 5 illustrates a flowchart for methods 500 tokenless authorization of a request for service that includes a transaction according to an embodiment of the present disclosure. In some embodiments, the steps shown in FIG. 5 are performed by an account repository 12 that stores the plurality of account information constructs 18 for a particular registrant. In some embodiments, the steps of the method 500 is performed by a biometric authentication system that is responsible for authorization of request for service. By storing a UDI 22 at a biometric repository 20 different than an account repository 12 and requiring verification from both the biometric repository 20 and the account repository 12 prior to transmitting the request for service to a third party, the systems and methods of the present disclosure enhance operational security and minimizes risks due to data breach.

Block 502. Referring to block 502 of FIG. 5, a UDI 22 is received from a first client device 300-1. In some embodiments, the UDI 22 is produced from an electronic representation of an initial biometric sampling associated with a registrant using a derivation process. In some embodiments, the electronic representation of the initial biometric sampling is captured by a biometric sample reader 600 associated with the first client device 300-1. Additionally, in some embodiments, the UDI 22 is produced at the first client device 300.

Block 504. Referring to block 504, a first plurality of account information constructs 18-1 associated with the registrant is received from first client device 300-1. The plurality of account information constructs 18 correspond to an account of the registrant with a third party, such as a financial institution. A unique SIN 16 s generated and associated with the biometric sample of the registrant in a biometric repository 20 via producing a UDI 22 in the biometric repository 20. In some embodiments, the first client device 300-1 sends the first plurality of account information constructs received from the registrant (such as via a card reader) to an account repository 12.

Block 506. Referring to block 506, an association between the plurality of account information constructs 18 and the UDI 22 is stored in an indexed data structure 14. In some embodiments, this association or link is stored in a variety of ways. For example, in some embodiments, the indexed data structure is be generated or updated that links the plurality of account information constructs 18 and the UDI 22 values together.

Block 508. Referring to block 508, an electronic representation of a second biometric sampling associated with the registrant is received (e.g., from the biometric repository 20) and a request for service (e.g., transaction information corresponding to an attempted transaction of the registrant with a merchant third party) is also received. In some embodiments, the request for service is received from the first client device 300-1, a second client device 300-2, or from the biometric repository 20 (which itself receives the transaction information from the first client device 300-1). In some embodiments, the biometric repository 20 is configured to receive the electronic representation of the second biometric sampling from the second client device 300-2 associated with the merchant and verify that the electronic representation of the second biometric sampling corresponds to a known representation of an initial biometric sampling prior to transmitting the electronic representation of the second biometric sampling, as discussed earlier. Since the electronic representation of the second biometric sampling is from the same registrant as the initial biometric sampling (e.g., a fingerprint of the same finger from the same user), the second biometric sampling substantially matches the first biometric sampling. In some embodiments, this matching is assessed by the pattern recognition mechanisms.

Block 510. Referring to block 510, the UDI 22 is derived by applying the derivation process to the second biometric sample. The computing device(s) executing the steps shown in FIG. 5 (e.g., the account repository 12) can store a copy of the derivation process used by the registration device in order to generate UDI 22 used to match biometric data to account data. Alternatively, the derivation process can be performed at the biometric repository and the resulting UDI 22 can be forwarded to the account repository 12.

Block 512. Referring to block 512, the plurality of account information constructs 18 associated with the UDI 22 is retrieved based at least in part on the UDI 22 and the index data structure. This step can include, for example, querying the index data structure with the derived UDI 22, though many variations are possible.

Block 514. Referring to Block 514, the transaction information and the unique SIN 16 corresponding to the retrieved account information is transmitted to a computing device associated with the corresponding financial institution, such as the card issuer for a particular registrant. The computing device associated with the corresponding financial institution can be configured to match the unique SIN 16 to the account of the registrant and either approve or deny the attempted transaction.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer-readable storage medium. For instance, the computer program product could contain instructions for operating the user interfaces described with respect to FIGS. 2 and 3. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method for comprising:
    obtaining, at a first device, an electronic representation of an initial biometric sampling of a registrant;
    applying, at the first device or a device in electronic communication with the first device, the electronic representation of the initial biometric sampling to a first one-way hash function, thereby producing an initial instance of a unique digital identifier (UDI);
    storing the initial instance of the UDI at a first repository;
    obtaining a first plurality of account information constructs associated with the registrant that uniquely corresponds to an account held by the registrant with a third party;
    generating, in electronic format, a unique secure identification number (SIN), through a second one-way hash function using (i) the instance of the UDI and (ii) the first plurality of account information constructs;
    storing a unique link from the UDI to the first plurality of account information constructs in an indexed data structure different than the biometric repository;
    receiving (i) a request from the registrant for a service to be performed and (ii) an electronic representation of a second biometric sampling of the registrant;
    forming a second instance of the UDI by applying the electronic representation of the second biometric sampling of the registrant to the first one-way hash function;
    verifying that the second instance of the UDI corresponds to the initial instance of the UDI;
    upon verification that the second instance of the UDI corresponds to the initial instance of the UDI, retrieving the first plurality of account information constructs; and transmitting the request for the service.

2. The method of claim 1, wherein the first device comprises a biometric sample reader configured to capture the initial biometric sampling from one or more fingerprints, one or more handprint, a face print, one or more auditory utterances, one or more retinal images, one or more uniquely identifying visual characteristic, or a combination thereof.

3. The method of claim 1, wherein the first repository is configured to generate the unique SIN.

4. The method of claim 3, wherein the first repository utilizes a quantum random number generator to generate the unique SIN.

5. The method of claim 1, wherein, for each electronic representation of a respective biometric sampling, the method further comprises:
    identifying, based on a corresponding electronic representation of the respective biometric sampling, a corresponding characteristic of the respective biometric sampling, and
    applying the corresponding characteristic of the respective biometric sampling to the first one-way hash function.

6. The method of claim 5, wherein the corresponding characteristic of the respective biometric sampling is an observable characteristic of the respective biometric sampling.

7. The method of claim 5, wherein the UDI comprises a coordinate mapping of the corresponding characteristic.

8. The method of claim 5, wherein the second one-way hash function comprises assigning a respective alphanumeric character to the corresponding characteristic.

9. The method of claim 5, wherein a first data size of the UDI is less than a second data size of an electronic representation of the respective biometric sampling.

10. The method of claim 1, wherein the first plurality of account information constructs is stored, at least in part, on a second repository that is out-of-band from the first repository.

11. The method of claim 1, wherein the first plurality of account information constructs is stored, at least in part, on a second repository that is out-of-band from the first repository.

12. The method of claim 1, wherein the method further comprises, in response to the retrieving the first plurality of account information constructs, further retrieving the unique SIN based on the retrieved first plurality of account information constructs.

13. The method of claim 1, wherein, prior to storing the UDI, the UDI is formed by the device in electronic communication with the first device by applying a derivation process to the respective biometric sampling.

14. The method of claim 13, wherein the derivation process of the initial instance of the UDI is conducted by the device in electronic communication with the first device.

15. The method of claim 1, wherein the method further comprises transmitting to the third party the unique SIN.

16. The method of claim 15, wherein the transmitting comprises forming a data construct comprising a digital stenography of the unique SIN.

17. The method of claim 1, wherein the method further comprises, prior to the applying the electronic representation of the initial biometric sampling to the first one-way function, encrypting the electronic representation of the initial biometric sampling, and wherein the first one-way function is, at least in part, configured to decrypt the encryption of the electronic representation of the initial biometric sampling.

18. The method of claim 17, wherein the electronic representation of the initial biometric sampling is encrypted at the first device, and wherein the device in electronic communication with the first device decrypts the encryption of the electronic representation of the initial biometric sampling.

19. The method of claim 1, wherein the first plurality of account information constructions comprises an account number, a document identifier, a blockchain public key, a blockchain private key, a blockchain wallet address, an expiration date, an identification number, a membership number, a payment card number, a physical address, a routing number, a security code number, a student identifier number, a subscription number, or a combination thereof.

20. The method of claim 1, wherein the method further comprises, upon verification that the second instance of the UDI corresponds to the initial instance of the UDI, storing transaction data information in the first plurality of account information associated with the request from the registration for the service to be performed.

21. The method of claim 1, wherein the service to be performed comprises a request to purchase a good, a request for authorization to information, a request for access to a good, a request for access to a physical location, or a combination thereof.

22. A non-transitory computer readable storage medium storing one or more programs, the one or more programs comprising instructions, which when executed by a computer system cause the computer system to perform a method comprising:

obtaining, at a first device, an electronic representation of an initial biometric sampling of a registrant;

applying, at the first device or a device in electronic communication with the first device, the electronic representation of the initial biometric sampling to a first one-way hash function, thereby producing an initial instance of a unique digital identifier (UDI);

storing the initial instance of the UDI at a first repository;

obtaining a first plurality of account information constructs associated with the registrant that uniquely corresponds to an account held by the registrant with a third party;

generating, in electronic format, a unique secure identification number (SIN), through a second one-way hash function using (i) the instance of the UDI and (ii) the first plurality of account information constructs;

storing a unique link from the UDI to the first plurality of account information constructs in an indexed data structure different than the biometric repository;

receiving (i) a request from the registrant for a service to be performed and (ii) an electronic representation of a second biometric sampling of the registrant;

forming a second instance of the UDI by applying the electronic representation of the second biometric sampling of the registrant to the first one-way hash function;

verifying that the second instance of the UDI corresponds to the initial instance of the UDI;

upon verification that the second instance of the UDI corresponds to the initial instance of the UDI, retrieving the first plurality of account information constructs; and transmitting the request for the service.

23. A computer system for tokenless authorization, the computer system comprising one or more processors, and a memory coupled to the one or more processors, the memory comprising one or more programs configured to be executed by the one or more processors to perform a method, the method comprising:

obtaining, at a first device, an electronic representation of an initial biometric sampling of a registrant;

applying, at the first device or a device in electronic communication with the first device, the electronic representation of the initial biometric sampling to a first one-way hash function, thereby producing an initial instance of a unique digital identifier (UDI);

storing the initial instance of the UDI at a first repository;

obtaining a first plurality of account information constructs associated with the registrant that uniquely corresponds to an account held by the registrant with a third party;

generating, in electronic format, a unique secure identification number (SIN), through a second one-way hash function using (i) the instance of the UDI and (ii) the first plurality of account information constructs;

storing a unique link from the UDI to the first plurality of account information constructs in an indexed data structure different than the biometric repository;

receiving (i) a request from the registrant for a service to be performed and (ii) an electronic representation of a second biometric sampling of the registrant;

forming a second instance of the UDI by applying the electronic representation of the second biometric sampling of the registrant to the first one-way hash function;

verifying that the second instance of the UDI corresponds to the initial instance of the UDI;

upon verification that the second instance of the UDI corresponds to the initial instance of the UDI, retrieving the first plurality of account information constructs; and transmitting the request for the service.

* * * * *